(12) United States Patent
Matsushima

(10) Patent No.: US 10,473,988 B2
(45) Date of Patent: *Nov. 12, 2019

(54) DISPLAY DEVICE, ELECTRONIC APPARATUS, AND METHOD OF MANUFACTURING DISPLAY DEVICE

(71) Applicant: Japan Display Inc., Tokyo (JP)

(72) Inventor: Toshiharu Matsushima, Kanagawa (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/843,532

(22) Filed: Dec. 15, 2017

(65) Prior Publication Data

US 2018/0107077 A1 Apr. 19, 2018

Related U.S. Application Data

(63) Continuation of application No. 15/045,810, filed on Feb. 17, 2016, now Pat. No. 9,874,792, which is a (Continued)

(30) Foreign Application Priority Data

Oct. 25, 2011 (JP) .................................. 2011-233724
Mar. 22, 2012 (JP) .................................. 2012-065248

(51) Int. Cl.
*G02F 1/1343* (2006.01)
(52) U.S. Cl.
CPC .................. *G02F 1/134363* (2013.01); *G02F 2001/134318* (2013.01); *G02F 2001/134372* (2013.01)

(58) Field of Classification Search
CPC ................................................ G02F 1/134363
See application file for complete search history.

(56) References Cited

U.S. PATENT DOCUMENTS 7,679,707 B2   3/2010   Tanaka
7,864,282 B2   1/2011   Shimura et al.
(Continued)

FOREIGN PATENT DOCUMENTS

JP   2000-321587 A   11/2000
JP   2003-202594 A    7/2003
(Continued)

OTHER PUBLICATIONS

Japanese Office Action dated Mar. 10, 2015 for corresponding Japanese Application No. 2012-065248.
(Continued)

*Primary Examiner* — Edmond C Lau
(74) *Attorney, Agent, or Firm* — Michael Best & Friedrich LLP

(57) ABSTRACT

A display device includes an electrode layer and a liquid crystal layer. The electrode layer has a first electrode and a second electrode. The second electrode is opposed to the first electrode and having a plurality of openings extending in a same extending direction. The liquid crystal layer is disposed on the electrode layer. The liquid crystal molecules of the liquid crystal layer in a region in proximity to one side of the opening and liquid crystal molecules of the liquid crystal layer in a region in proximity to another side of the opening, the sides of the opening being opposed to each other in a width direction of the opening, are rotated in opposite directions from each other and aligned.

12 Claims, 22 Drawing Sheets

Related U.S. Application Data continuation of application No. 13/655,140, filed on Oct. 18, 2012, now Pat. No. 9,298,051.

(56) References Cited

U.S. PATENT DOCUMENTS

| | | | |
|---|---|---|---|
| 9,298,051 B2* | 3/2016 | Matsushima | G02F 1/134363 |
| 9,874,792 B2* | 1/2018 | Matsushima | G02F 1/134363 |
| 2007/0242204 A1 | 10/2007 | Fujita et al. | |
| 2007/0242205 A1* | 10/2007 | Shimura | G02F 1/134363 349/141 |
| 2010/0173556 A1 | 7/2010 | Naka et al. | |
| 2011/0122342 A1 | 5/2011 | Nishimura et al. | |

FOREIGN PATENT DOCUMENTS

| | | |
|---|---|---|
| JP | 2007-212706 A | 8/2007 |
| JP | 2007-226179 A | 9/2007 |
| JP | 2007-286115 | 11/2007 |
| JP | 2008-052161 | 3/2008 |
| JP | 2008-216501 A | 9/2008 |
| JP | 2008-287074 A | 11/2008 |
| KR | 10-2009-0010013 A | 1/2009 |

OTHER PUBLICATIONS

Taiwanese Office Action dated Jan. 21, 2015 for corresponding Taiwanese Application No. 101134803.
Japanese Patent Office Action for Application No. 2012-065248 dated Sep. 29, 2015 (9 pages).
Corresponding Chinese Office Action; Application No. 201210413075.3; dated Mar. 21, 2016.
Korean Office Action corresponding to Korean Patent Application No. 10-2012-0115189 dated Nov. 21, 2018.
Korean Office Action dated May 27, 2019, corresponding to Korean Patent Application No. 10-2012-0115189.

* cited by examiner

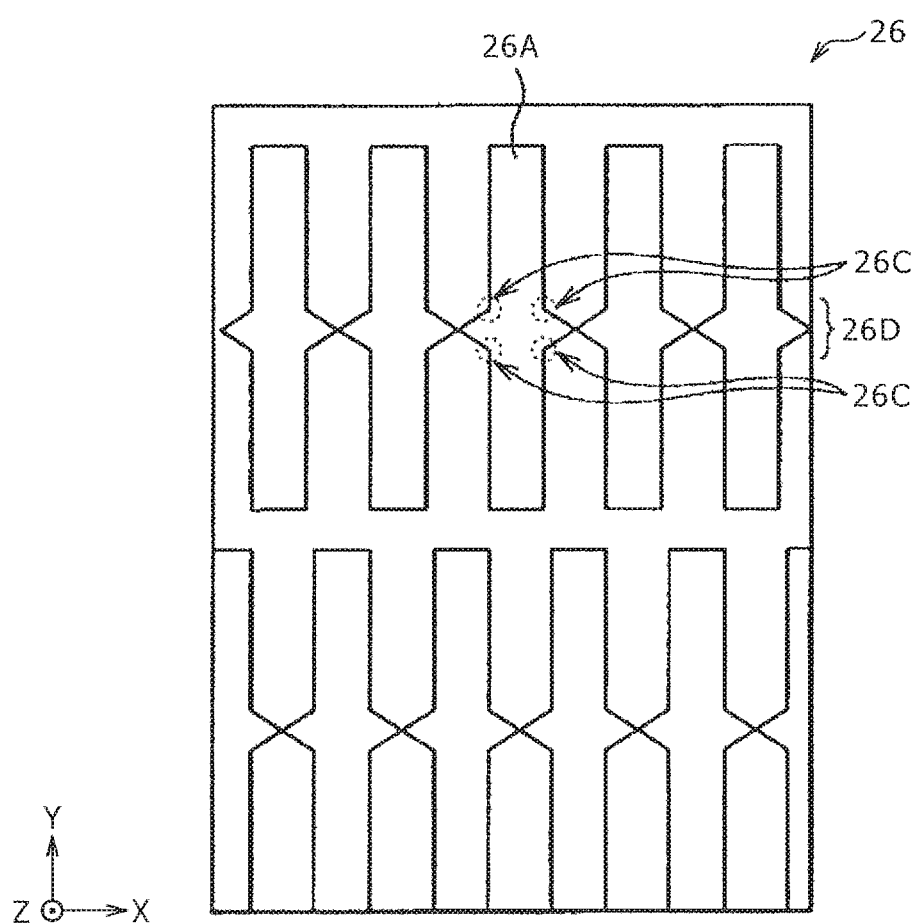

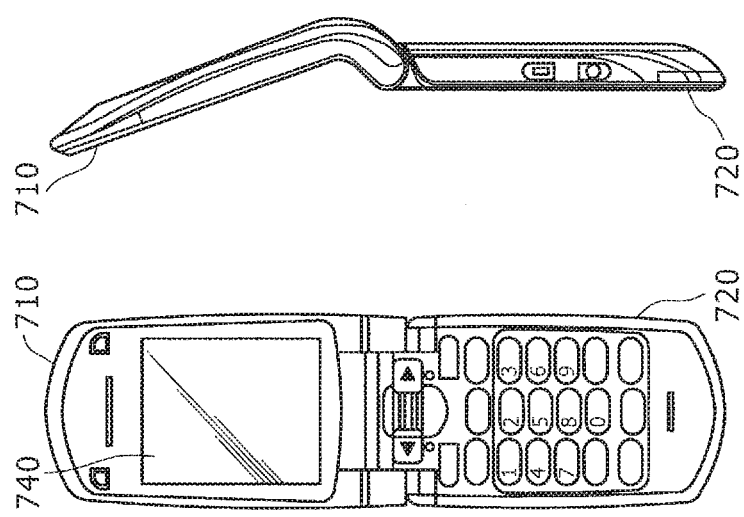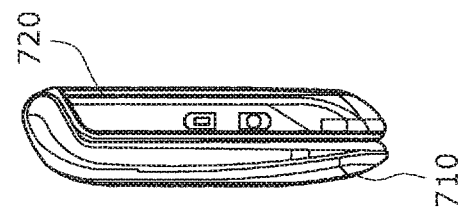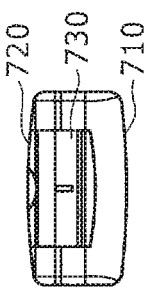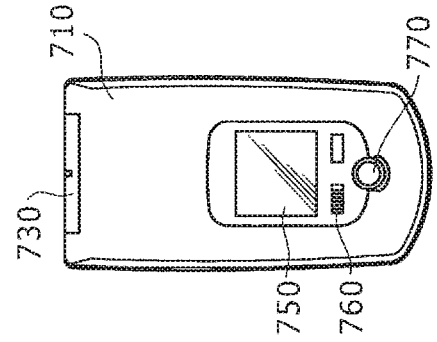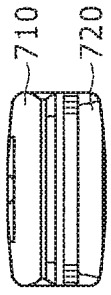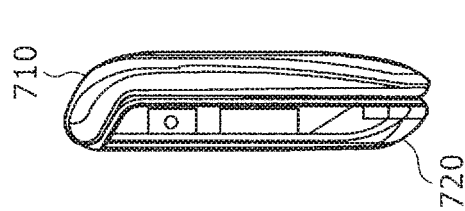

DISPLAY DEVICE, ELECTRONIC APPARATUS, AND METHOD OF MANUFACTURING DISPLAY DEVICE

CROSS REFERENCES TO RELATED APPLICATIONS

This is a Continuation of application Ser. No. 15/045,810, filed on Feb. 17, 2016, which is a Continuation of application Ser. No. 13/655,140, filed on Oct. 18, 2012, now U.S. Pat. No. 9,298,051, issued on Mar. 29, 2016, which claims priority to Japanese Patent Application Number 2011-233724, filed on Oct. 25, 2011 and Japanese Patent Application Number 2012-065248, filed on Mar. 22, 2012, the entire contents of which are incorporated herein by reference.

BACKGROUND

The present technology relates to a display device controlling liquid crystal molecules by a transverse electric field, or particularly an FFS (Fringe Field Switching) mode, an electronic apparatus, and a method of manufacturing the display device.

Liquid crystal display devices are roughly classified into a vertical electric field type and a transverse electric field type according to the direction of an electric field. The transverse electric field type is more advantageous than the vertical electric field type in that the transverse electric field type provides a wide viewing angle. Such a transverse electric field type includes an IPS (In-Plane-Switching) mode and the FFS mode (Japanese Patent Laid-Open No. 2008-52161).

In the IPS mode, a pixel electrode and a common electrode are disposed in a same layer, and an electric field mainly occurs in only a direction parallel to a substrate surface. Thus, the electric field is not readily formed in a region directly above the pixel electrode, and liquid crystal molecules in the region directly above the pixel electrode cannot be driven. On the other hand, in the FFS mode, a pixel electrode and a common electrode are superposed on each other with a dielectric film interposed between the pixel electrode and the common electrode, and an electric field in an oblique direction with respect to a substrate surface or an electric field in a radial form occurs, so that liquid crystal molecules in a region directly above the pixel electrode can be driven. That is, the FFS mode provides a higher aperture ratio than the IPS mode.

SUMMARY

However, liquid crystal display devices in such an FFS mode, as with other liquid crystal display devices, have a problem of a slow response speed.

The present technology has been made in view of such a problem. It is desirable to provide a display device having a faster response speed, an electronic apparatus, and a method of manufacturing the display device.

According to an embodiment of the present technology, there is provided a display device including: an electrode layer including a first electrode and a second electrode, the second electrode being opposed to the first electrode and having a plurality of openings extending in a same extending direction; and a liquid crystal layer disposed on the electrode layer, liquid crystal molecules of the liquid crystal layer in a region in proximity to one side of the opening and liquid crystal molecules of the liquid crystal layer in a region in proximity to another side of the opening, the sides of the opening being opposed to each other in a width direction of the opening, being rotated in opposite directions from each other and aligned. An electronic apparatus according to an embodiment of the present technology includes the above-described display device.

According to an embodiment of the present technology, there is provided a method of manufacturing a display device. The method includes: forming an electrode layer including a first electrode and a second electrode, the second electrode being opposed to the first electrode and having a plurality of openings extending in a same extending direction; and forming a liquid crystal layer on the electrode layer after performing alignment treatment so that liquid crystal molecules of the liquid crystal layer in a region in proximity to one side of an opening and liquid crystal molecules of the liquid crystal layer in a region in proximity to another side of the opening, the sides of the opening being opposed to each other in a width direction of the opening, are rotated in opposite directions from each other and aligned.

The display device, the electronic apparatus, and the method of manufacturing the display device shorten a response time because liquid crystal molecules in a region in proximity to one side of an opening and liquid crystal molecules in a region in proximity to another side of the opening at a time of application of voltage are rotated in opposite directions from each other and aligned.

According to the display device, the electronic apparatus, and the method of manufacturing the display device, liquid crystal molecules in a region in proximity to one side of an opening and liquid crystal molecules in a region in proximity to another side of the opening are rotated in opposite directions from each other and aligned. Therefore a response speed characteristic can be improved. It is thus possible to achieve an increase in response speed in addition to a wide viewing angle and a high aperture ratio realized by driving with a transverse electric field.

BRIEF DESCRIPTION OF THE DRAWINGS

FIG. 3 is a plan view of an example of modification of corner parts shown in FIGS. 2A and 2B;

FIGS. 24A, 24B, 24C, 24D, 24E, 24F, and 24G are diagrams showing an external appearance of a portable telephone to which the display devices according to the foregoing embodiments and the like are applied.

DETAILED DESCRIPTION OF THE PREFERRED EMBODIMENTS

Preferred embodiments of the present technology will hereinafter be described in detail with reference to the drawings.

First Embodiment

Figure 1:
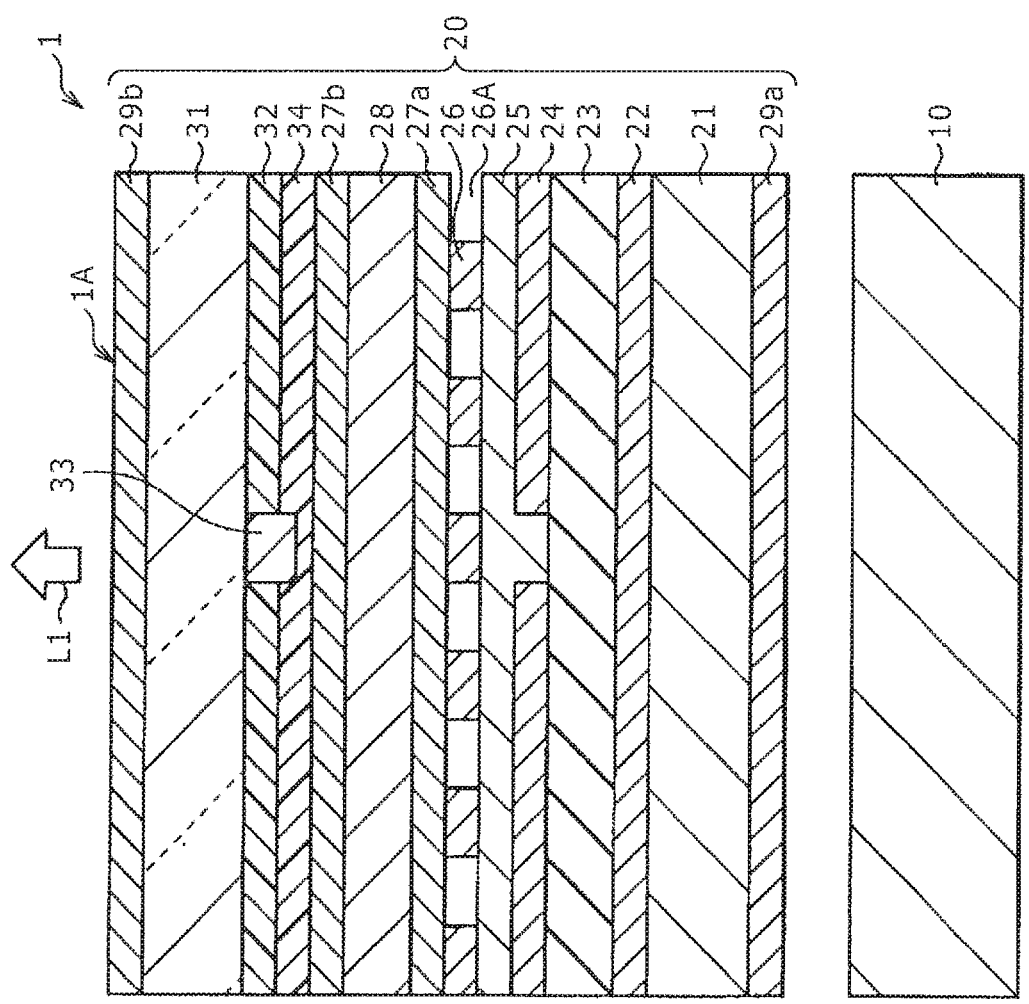
FIG. 1 is a sectional view of a structure of a display device according to a first embodiment.

FIG. 1 is a sectional view of a structure of a display device according to a first embodiment. The display device 1 is a liquid crystal display device of a transverse electric field type. The display device 1 includes a backlight 10, a liquid crystal panel 20 in the FFS mode, and a driving circuit (not shown) for driving these parts. Incidentally, FIG. 1 schematically shows the structure of the display device 1, and does not necessarily show dimensions and shapes identical to actual dimensions and shapes.

The backlight 10 irradiates the liquid crystal panel 20 from the rear of the liquid crystal panel 20. The backlight 10 is for example a surface light emitting source of an edge light system. The backlight 10 includes a diffuser and a reflector on the back surface of a light guide plate of an edge light emitting type. The backlight 10 may be a direct type surface light emitting source.

The liquid crystal panel 20 generates image light L1 by modulating light emitted from the backlight 10 according to a video signal, and outputs the image light L1 from a video display surface 1A. The liquid crystal panel 20 includes, from the side of the backlight 10, a substrate 21, a TFT (Thin Film Transistor) layer 22, a planarizing layer 23, a pixel electrode 24 (first electrode), a dielectric film 25, a common electrode 26 (second electrode), an alignment film 27a, a liquid crystal layer 28, an alignment film 27b, and a counter substrate 31. That is, the liquid crystal panel 20 of the transverse electric field type has the liquid crystal layer 28 between the substrate 21 and the counter substrate 31, and the pixel electrode 24 and the common electrode 26 are both disposed on the side of the substrate 21. A color filter 32, a light shielding film 33, and an overcoat layer 34 are disposed on the surface of the counter substrate 31 which surface is opposed to the substrate 21. A polarizer 29a is disposed on the surface of the substrate 21 which surface is on the side of the backlight 10. A polarizer 29b is disposed on the surface of the counter substrate 31 which surface is on the side of the video display surface 1A. An electrostatic shielding layer (not shown) may be disposed over the counter substrate 31 in order to suppress the effects of static electricity.

The polarizers 29a and 29b are a kind of optical shutter, and pass only light in a certain direction of vibration (polarized light). These polarizers 29a and 29b are disposed such that the polarization axes (transmission axes) of the polarizers 29a and 29b are displaced from each other by 90 degrees. Thereby, the light emitted from the backlight 10 passes through the liquid crystal panel 20, or is blocked.

The substrate 21 and the counter substrate 31 are formed by a substrate transparent to visible light, for example a sheet glass or a light transmitting resin substrate. The TFT layer 22 has functions of switching elements for selecting pixels. The TFT layer 22 is formed by TFTs each including for example a gate electrode, a gate insulating film, a semiconductor film, and a source and a drain electrode. The TFT layer 22 may be of either of a bottom gate type and a top gate type. The semiconductor film may be formed by any of a-Si (amorphous silicon), an oxide semiconductor, an organic semiconductor, and the like. The planarizing layer 23 is provided to planarize the surface of the TFT layer 22 formed on the substrate 21, and has minute connecting holes (not shown) disposed therein to connect the above-described TFTs to the pixel electrode 24. A material providing good pattern accuracy is therefore desirably used as the planarizing layer 23. Such materials include for example organic materials such as polyimide and the like or inorganic materials such as silicon oxide ($SiO_2$) and the like.

The pixel electrode 24 is provided for each pixel on the planarizing layer 23. The pixel electrode 24 has for example a rectangular shape, and is regularly arranged in a lattice arrangement, a delta arrangement, or the like. The common electrode 26 is opposed to the pixel electrode 24 with the dielectric film 25 between the common electrode 26 and the pixel electrode 24. The dielectric film 25 ensures isolation between the pixel electrode 24 and the common electrode 26, and protects the TFT layer 22, the pixel electrode 24, and the like. The dielectric film 25 is disposed over the entire surface of the substrate 21. The dielectric film 25 is formed by a material having a light transmitting property and an insulating property, for example silicon nitride (SiN) or silicon oxide ($SiO_2$). This dielectric film 25 may also be formed by the planarizing layer 23, a passivation layer of the TFT layer 22, or the like.

Figure 2A:
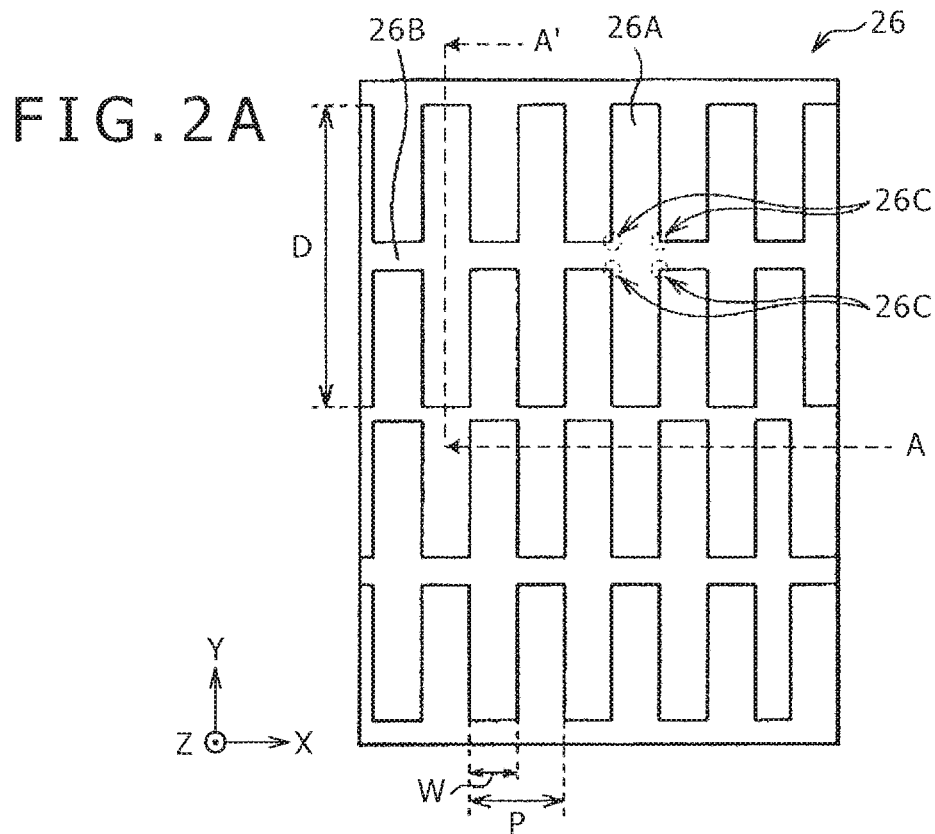
FIGS. 2A and 2B are plan views of a configuration of a common electrode shown in FIG. 1.
Figure 2B:
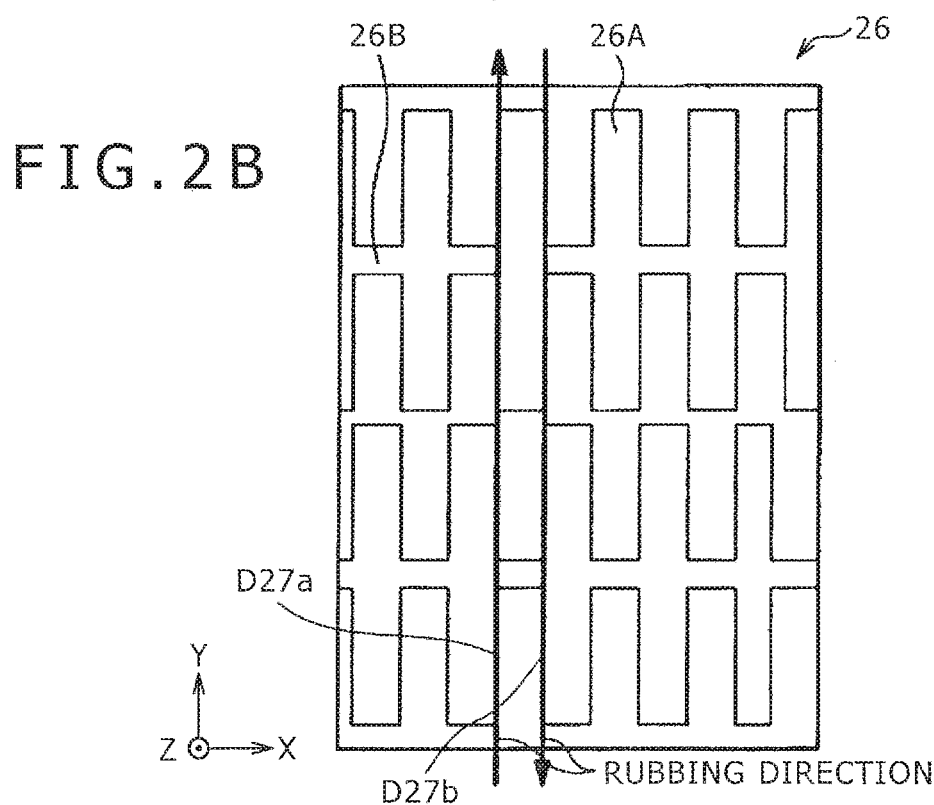

The common electrode 26 lies astride each pixel, and is disposed in a planar shape over an entire display region. FIGS. 2A and 2B are plan views of a configuration of the common electrode shown in FIG. 1. As shown in FIG. 2A, the common electrode 26 has a plurality of rectangular openings 26A having a length (long side) D and a width (short side) W at such positions as to be opposed to the pixel electrode 24. The plurality of openings 26A are arranged so as to extend in a same extending direction (long side direction) (Y-axis direction). In the present embodiment, liquid crystal molecules of the liquid crystal layer 28 in a region in proximity to one side of the long sides of an opening 26A which long sides are opposed to each other in a direction of width (X-axis direction) and liquid crystal molecules of the liquid crystal layer 28 in a region in proximity to the other side of the long sides of the opening 26A at a time of application of voltage are rotated (twisted) in opposite directions from each other (FIG. 5B to be described later) and aligned. This improves a response speed characteristic. The length D is for example 10 to 60 µm, and is desirably less than 40 µm. This is because the direction of rotation (alignment) of the liquid crystal molecules tends to be stabilized when the length D is less than 40 µm. The width W is for example 2 to 5 µm. A pitch P in the X-axis direction is 4 to 10 µm. The width W is desirably smaller for higher response speed.

Figure 4:
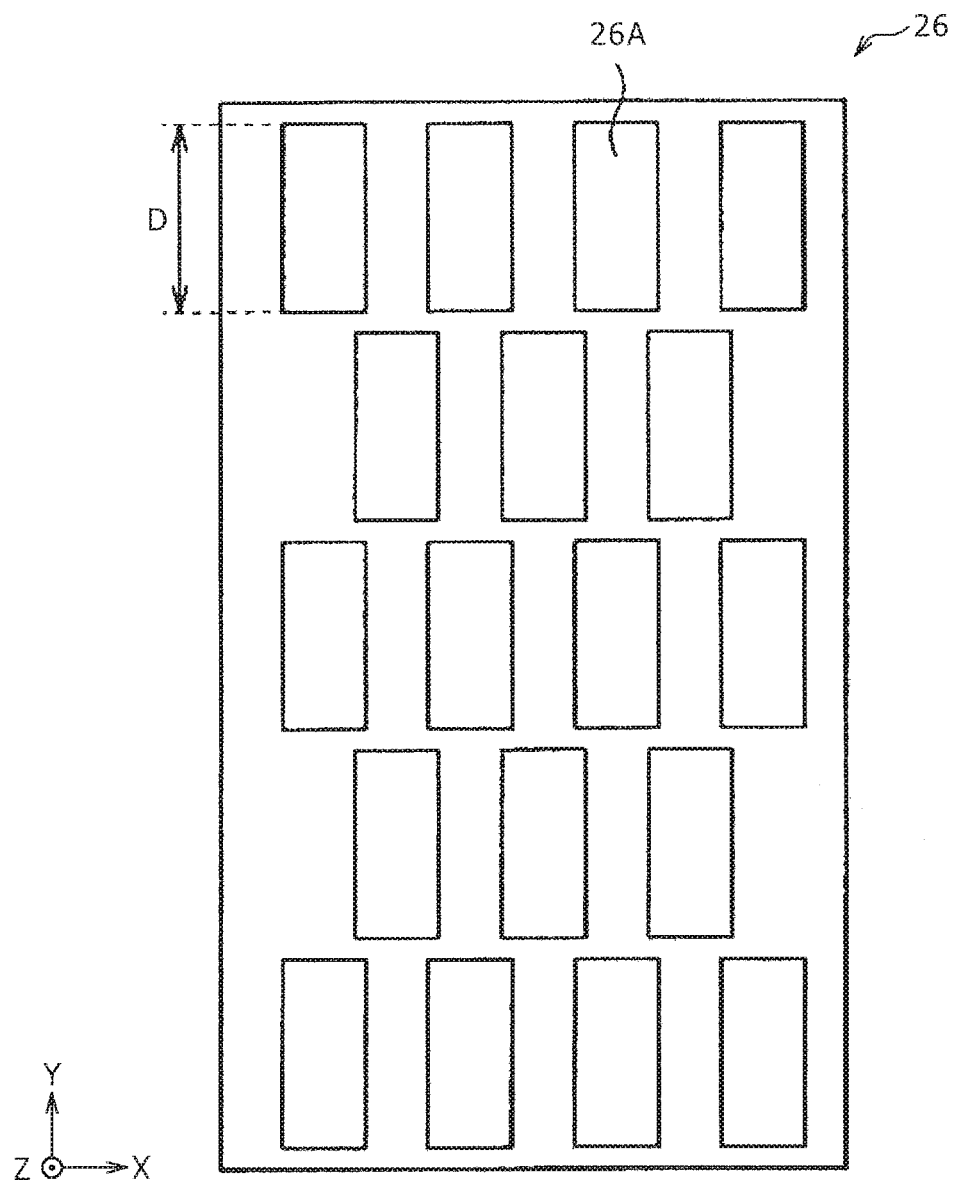
FIG. 4 is a plan view of an example of modification of the common electrode shown in FIGS. 2A and 2B.
Figure 6:
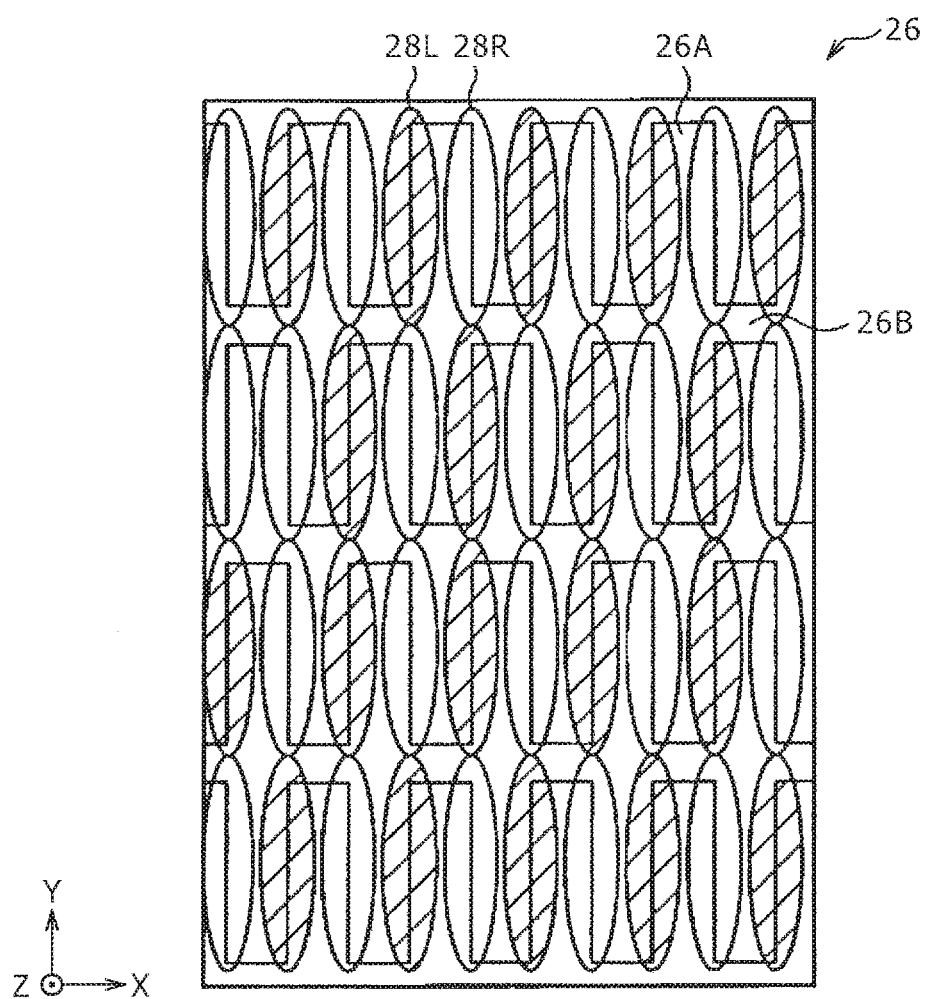
FIG. 6 is a plan view schematically showing the directions of rotation of the liquid crystal molecules shown in FIGS. 5A and 5B above the common electrode.

A plurality of openings 26A arranged in a same row (same position on a Y-axis) have upper ends thereof aligned with each other and have lower ends thereof aligned with each other. A plurality of openings 26A in rows adjacent to each other are displaced from each other by ½ P in the X-axis direction, and are arranged in a staggered form. Such a staggered arrangement brings liquid crystal molecules rotated in a same direction at the openings 26A in the rows adjacent to each other closer to each other, and thus stabilizes the alignment (FIG. 6 to be described later). The common electrode 26 has a communicating extended-width part 26B for making openings 26A arranged in the same row communicate with each other. This communicating extended-width part 26B is formed by coupling regions of the openings 26A adjacent to each other in the X-axis direction which regions have an extended width in the width direction around the centers of long sides of the openings 26A. The long sides of the openings 26A have four corner parts 26C at points of intersection of the long sides of the openings 26A and the communicating extended-width part 26B. These corner parts 26C have functions of an electric field control section. An electric field control section is to make the directions of rotation of liquid crystal molecules from one end of an opening 26A in the direction of the long sides of the opening 26A to a corner part 26C identical to each other, and stabilize the directions of rotation of the liquid crystal molecules. FIG. 3 is a plan view of an example of modification of the corner parts shown in FIGS. 2A and 2B. FIG. 4 is a plan view of an example of modification of the common electrode shown in FIGS. 2A and 2B. As shown in FIG. 3, corner parts 26C may be provided without extended-width parts in the form of wedges (extended-width parts 26D) of respective openings 26A communicating with each other. However, the communicating extended-width parts 26B can be manufactured more easily than the extended-width parts 26D. In addition, as shown in FIG. 4, the common electrode 26 may be formed without extended-width parts (the communicating extended-width parts 26B or the extended-width parts 26D). In this case, the length D is desirably small, for example 20 µm or less, in order to stabilize the directions of rotation. The pixel electrode 24 and the common electrode 26 are formed of a conductive material transparent to visible light, for example ITO (Indium-Tin-Oxide).

The alignment films 27a and 27b are to align the liquid crystal molecules of the liquid crystal layer 28 in a predetermined direction as described above. The alignment films 27a and 27b are formed by for example a polymeric material such as polyimide or the like that has undergone a rubbing process. In the display device 1, the alignment films 27a and 27b are subjected to a rubbing process for antiparallel alignment in directions parallel to the extending direction of the openings 26A (FIG. 2B). Thereby, liquid crystal molecules in proximity to one side of an opening 26A and liquid crystal molecules in proximity to the other side of the opening 26A, the sides of the opening 26A being opposed to each other in a direction of width, at a time of application of voltage are rotated in opposite directions from each other and aligned.

Specifically, the alignment film 27a has been subjected to a rubbing process in a rubbing direction D27a, and the alignment film 27b has been subjected to a rubbing process in a rubbing direction D27b, which is an opposite direction from the rubbing direction D27a. In addition, the rubbing directions D27a and D27b are parallel to the extending direction of the openings 26A. A parallel state in this case includes a state in which the rubbing directions D27a and D27b intersect the extending direction of the openings 26A at an angle of one degree or less.

Figure 5A:
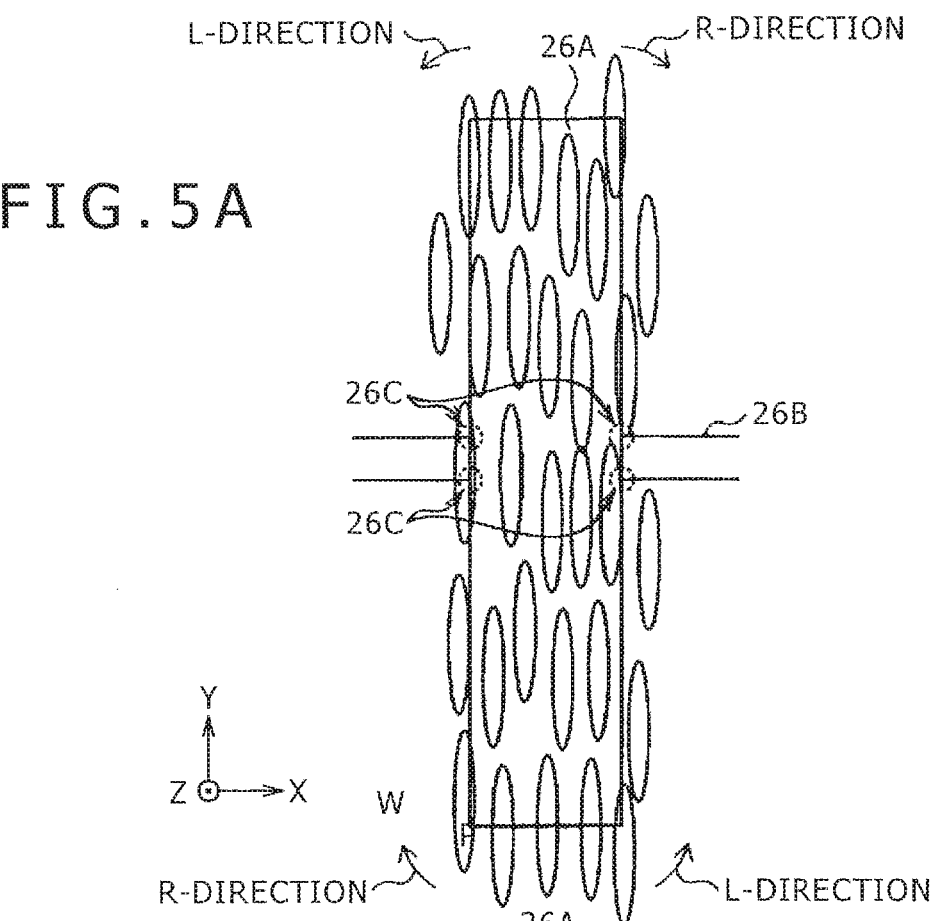
FIGS. 5A and 5B are plan views of the movement of liquid crystal molecules of a liquid crystal layer shown in FIG. 1.
Figure 5B:
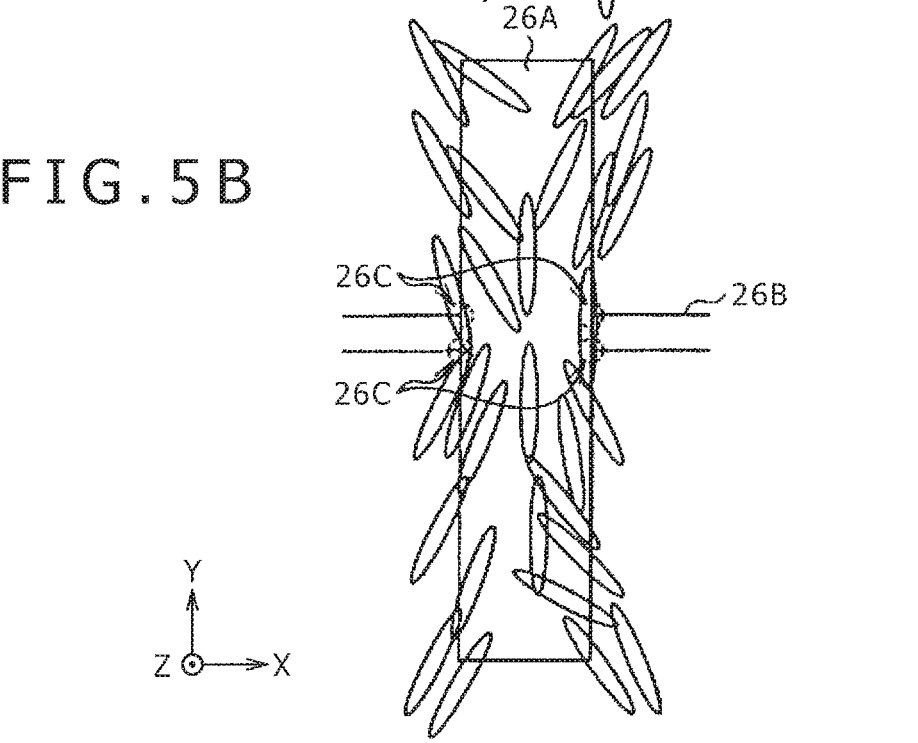

The liquid crystal layer 28 is formed by for example a nematic liquid crystal having negative dielectric anisotropy. The liquid crystal layer 28 has a modulating function for transmitting or blocking the incident light from the backlight 10 in each pixel according to a voltage applied from the driving circuit. The gradation of each pixel can be adjusted by changing the level of the light transmission. FIGS. 5A and 5B are plan views of the movement of liquid crystal molecules of the liquid crystal layer shown in FIG. 1. FIG. 5A shows a state of liquid crystal molecules of the liquid crystal layer 28 above an opening 26A before application of a voltage. FIG. 5B shows a state of the liquid crystal molecules of the liquid crystal layer 28 above the opening 26A after the application of the voltage. The major axes of the liquid crystal molecules before the application of the voltage are oriented in substantially a same direction (Y-axis direction). When the voltage is applied, the liquid crystal molecules in proximity to one side of the opening 26A and the liquid crystal molecules in proximity to the other side of the opening 26A, the sides of the opening 26A being opposed to each other in the width direction, are rotated in opposite directions from each other and aligned. Specifically, in the vicinity of one side of the long sides of the opening 26A (right side of the page of FIG. 5B), liquid crystal molecules from an upper end to a corner part 26C are rotated in an R-direction (clockwise) and aligned, and liquid crystal molecules from a corner part 26C to a lower end are rotated in an L-direction (counterclockwise) and aligned. In the vicinity of the other side of the long sides of the opening 26A (left side of the page of FIG. 5B), liquid crystal molecules from an upper end to a corner part 26C are rotated in the L-direction and aligned, and liquid crystal molecules from a corner part 26C to a lower end are rotated in the R-direction and aligned. Molecules rotated in the respective directions are mixed with each other in an intermediate part between the one side and the other side. FIG. 6 is a plan view schematically showing the directions of rotation of the liquid crystal molecules shown in FIGS. 5A and 5B above the common electrode. FIG. 6 schematically shows the liquid crystal layer 28 with regions rotated in the R-direction as regions 28R and with regions rotated in the L-direction as regions 28L. As described above, the openings 26A in rows adjacent to each other are displaced from each other in the X-axis direction and thereby arranged in a staggered form. Thus, the regions 28L above the openings 26A in the rows adjacent to each other are close to each other, and the regions 28R above the openings 26A in the rows adjacent to each other are close to each other, so that the alignment is stabilized. When the liquid crystal layer 28 is a nematic liquid crystal having positive dielectric anisotropy, the liquid crystal molecules can be aligned similarly by subjecting the alignment films 27*a* and 27*b* to rubbing processes in directions (X-axis direction) orthogonal to the extending direction of the openings 26A.

The color filter 32 is to effect color separation of the light transmitted by the liquid crystal layer 28 into for example the three primary colors of red (R), green (G), and blue (B), the four colors of red, green, blue, and white (W), or the like. The color filter 32 is provided so as to correspond to the arrangement of the pixel electrode 24. This arrangement is for example a stripe arrangement, a diagonal arrangement, a delta arrangement, a rectangle arrangement, or the like. The light shielding film 33 is to reduce crosstalk between the pixels, and has a function of absorbing visible light. The light shielding film 33 is a film in the form of a lattice with openings. The openings are arranged in regions opposed to the pixel electrode 24. The overcoat layer 34 is a coating agent for improving the flatness of the surface of the color filter 32, and protecting the surface of the color filter 32. The overcoat layer 34 is formed of an organic material such as a resin or the like or an inorganic material such as $SiO_2$, SiN, ITO, or the like.

Such a display device 1 can be manufactured as follows, for example.

First, the TFT layer 22 and the planarizing layer 23 are formed on the substrate 21 in this order. Connecting holes for connecting the pixel electrode 24 to TFTs are made in the planarizing layer 23 by photolithography techniques. Next, the pixel electrode 24 made of ITO having a thickness (thickness in a direction of lamination, which direction will hereinafter be referred to simply as a thickness) of 500 to 1500 Å, for example, is formed by performing patterning for each pixel on the planarizing layer 23. Next, the dielectric film 25 made of silicon nitride is formed with a thickness of 1000 to 6000 Å on the pixel electrode 24 by a plasma CVD (Chemical Vapor Deposition) method, for example. After the dielectric film 25 is formed, a film of ITO of 100 to 1000 Å, for example, is formed by a sputtering method, and this film is etched using a mask. Thereby the common electrode 26 having the openings 26A and the communicating extended-width parts 26B is formed. The common electrode 26 is thinner than the pixel electrode 24. The thickness of the common electrode 26 is adjusted in consideration of resistance and level difference. The alignment film 27*a* is formed on the common electrode 26, and a rubbing process is applied to the alignment film 27*a* in a direction parallel to the extending direction of the openings 26A.

Meanwhile, the color filter 32, the light shielding film 33, the overcoat layer 34, and the alignment film 27*b* are formed on the side of the counter substrate 31 in this order. As with the alignment film 27*a*, the alignment film 27*b* is subjected to a rubbing process in a direction parallel to the extending direction of the openings 26A. After the formation of up to the alignment film 27*b* on the counter substrate 31 and the formation of the alignment film 27*a* above the substrate 21 as described above, these substrates are opposed to each other, and a liquid crystal is injected into a space between the substrate 21 and the counter substrate 31, whereby the liquid crystal layer 28 is formed. The liquid crystal panel 20 is housed in a casing (not shown) together with the backlight 10 to complete the display device 1.

In the display device 1 according to the present embodiment, when light in a planar form is emitted from the upper surface of the backlight 10 and enters the back surface of the liquid crystal panel 20, pixels are selected, and a predetermined voltage is applied between the pixel electrode 24 and the common electrode 26. At this time, a transverse electric field occurs in a region directly above the openings 26A of the common electrode 26, and a transverse oblique electric field occurs in other regions, so that the alignment of the liquid crystal molecules of the liquid crystal layer 28 is controlled. The incident light from the backlight 10 passes through the liquid crystal layer 28, so that image light L1 is output from the video display surface 1A.

In this case, response speed is increased because liquid crystal molecules in a region in proximity to one side of the long sides of the opening 26A of the common electrode 26 and liquid crystal molecules in a region in proximity to the other side of the long sides of the opening 26A are rotated in opposite directions from each other and aligned. This will be described in the following using a comparative example.

Figure 7A:
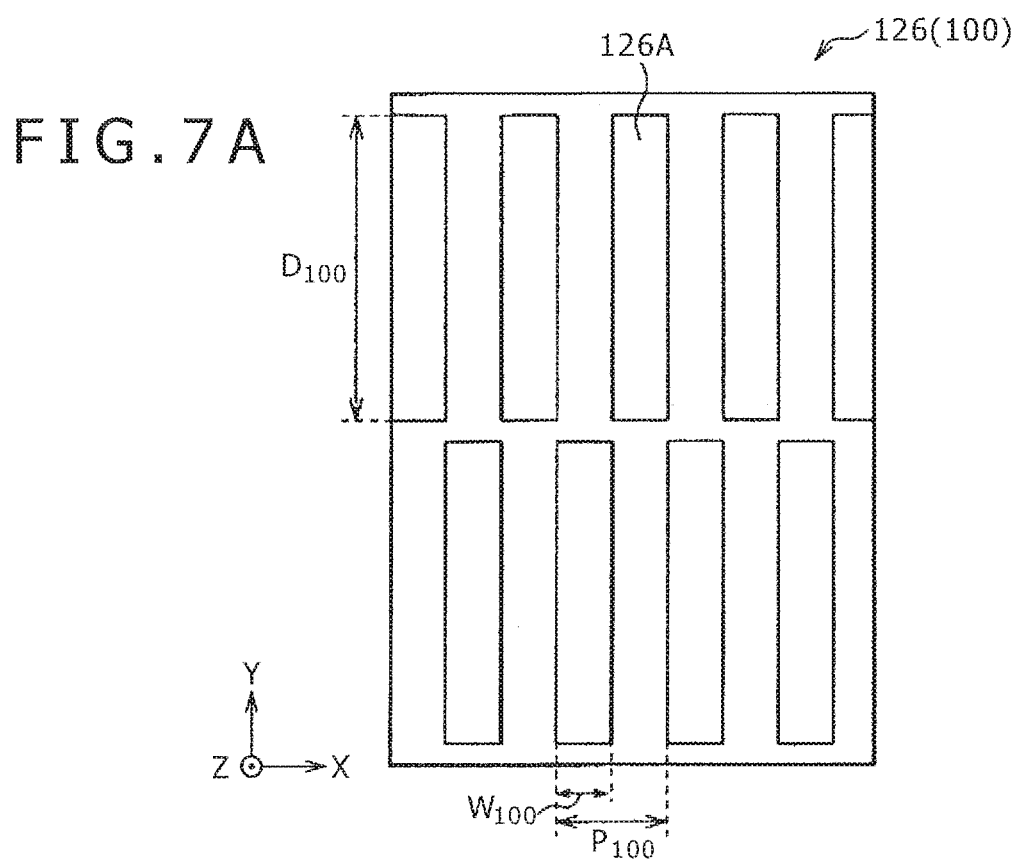
FIGS. 7A and 7B are plan views showing a configuration of a common electrode according to a comparative example.
Figure 7B:
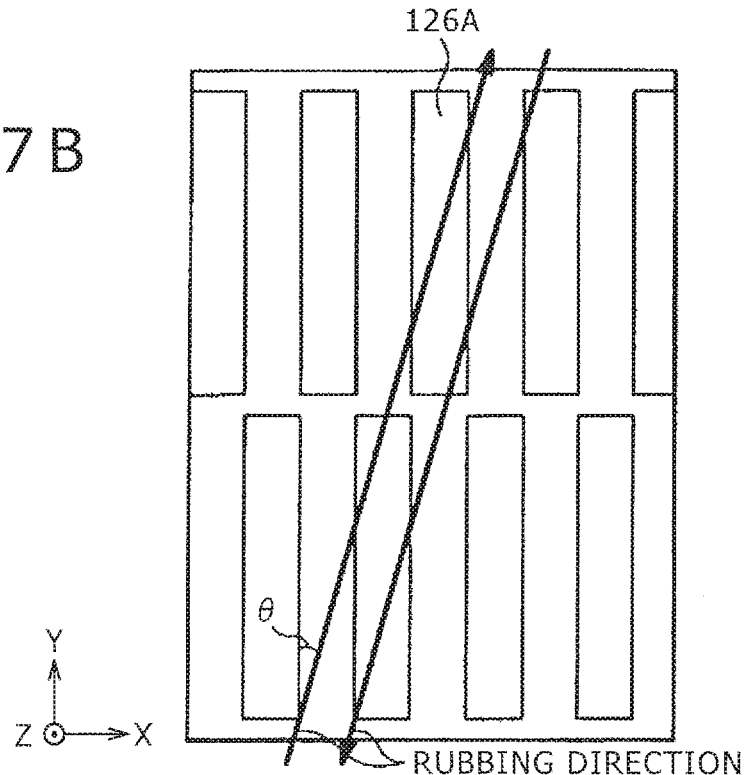
Figure 8A:
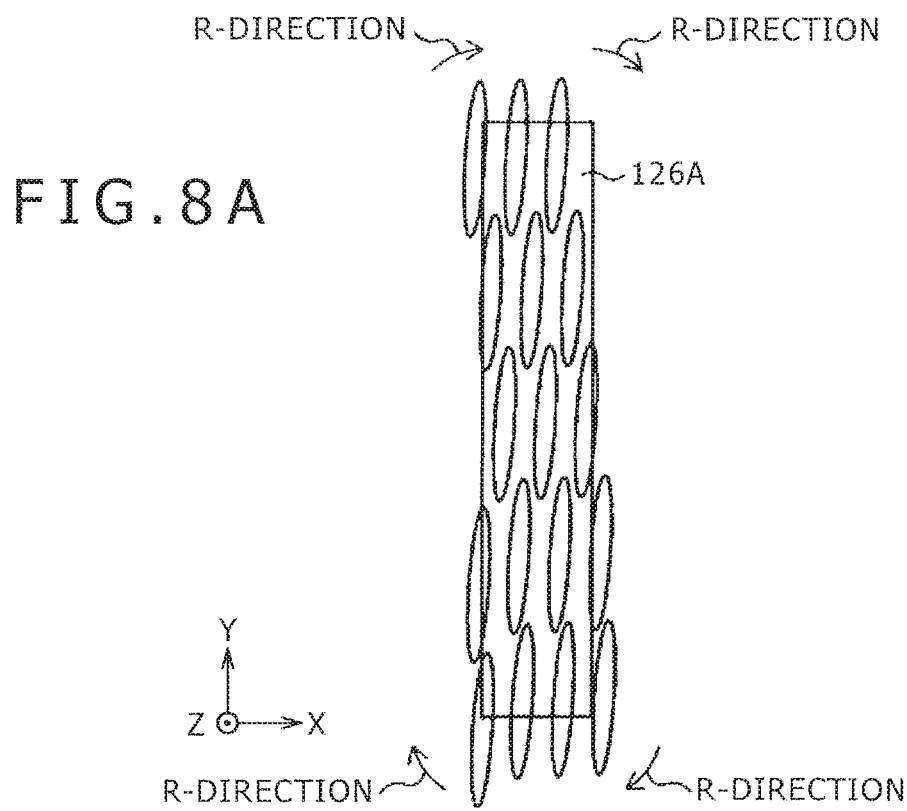
FIGS. 8A and 8B are plan views showing the movement of liquid crystal molecules in a case where the common electrode shown in FIGS. 7A and 7B is used.
Figure 8B:
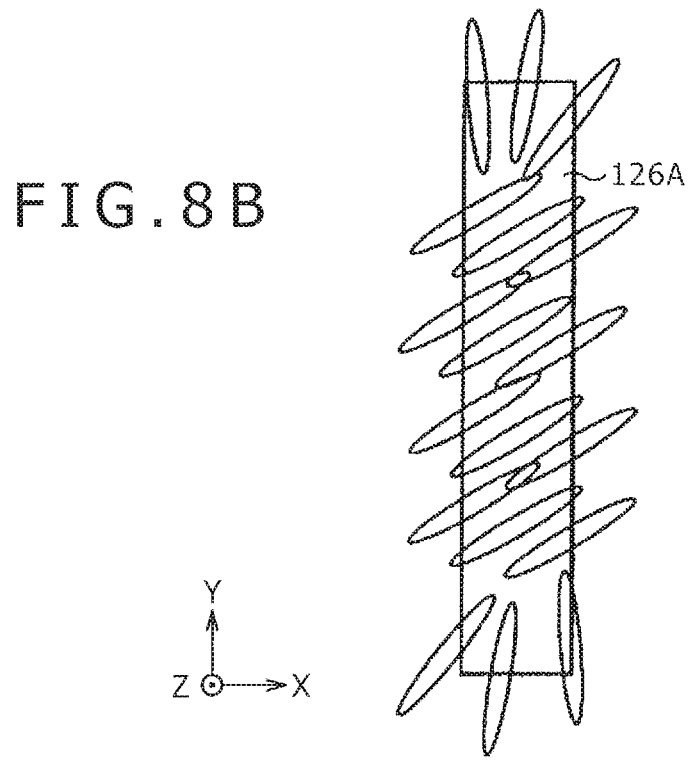

FIGS. 7A and 7B are plan views showing a configuration of a common electrode according to the comparative example. FIGS. 8A and 8B are plan views showing the movement of liquid crystal molecules in a case where the common electrode shown in FIGS. 7A and 7B is used. FIG. 7A shows a planar configuration of the common electrode 126 of a display device (display device 100) according to the comparative example. As with the common electrode 26, the common electrode 126 has a plurality of rectangular openings 126A having a length D100 and a width W100. However, the common electrode 126 does not have communicating extended-width parts. In the display device 100, as shown in FIG. 7B, alignment films have been subjected to rubbing processes in directions intersecting the extending direction of the openings 126A at an angle θ, so that all liquid crystal molecules at a time of application of voltage are rotated by the angle θ in a same direction (R-direction) and aligned in order to increase light transmittance (FIG. 8A and FIG. 8B). The display device 100 therefore has a slow response speed. Double-speed/quadruple-speed driving, a black inserting B/L (backlight), and the like are proposed to improve response speed. However, these methods impose a heavy load on a peripheral circuit. Other methods for improving response speed by OCB (Optically Compensated Bend) (n-cells), a ferroelectric liquid crystal, or a liquid crystal mode such as a blue phase or the like are also proposed. However, these methods also impose a heavy load on a driving circuit, or are difficult to put to practical use in terms of reliability or cost.

Figure 9:
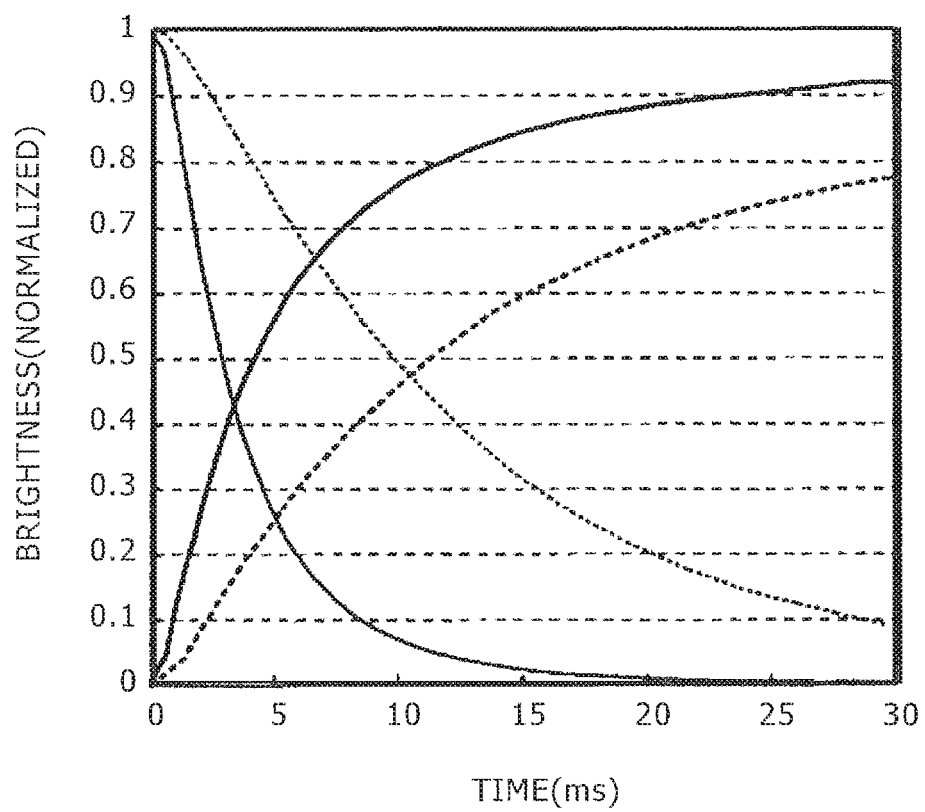
FIG. 9 is a diagram showing the response speed of the display device shown in FIG. 1.

In the display device 1 according to the present embodiment, on the other hand, liquid crystal molecules in proximity to one side of the long sides of an opening 26A and liquid crystal molecules in proximity to the other side of the long sides of the opening 26A are rotated in opposite directions from each other and aligned (FIG. 5B), so that the response speed is improved. FIG. 9 is a diagram showing the response speed of the display device shown in FIG. 1. FIG. 9 shows results of measurement of response speeds Ton and Toff of the display device 1 and the display device 100. Solid lines represent the response speed of the display device 1. Broken lines represent the response speed of the display device 100. At the time of the measurement, the widths W and W100 of the openings 26A and 126A were 3 μm, and the pitches P and P100 of the openings 26A and 126A were 6 μm. Thus, the response speeds were measured under similar conditions except for the rubbing directions of the alignment films. As a result, the response speed Ton of the display device 100 was 27 ms, and the response speed Toff of the display device 100 was 25 ms, whereas the response speed Ton of the display device 1 was 10.75 ms, and the response speed Toff of the display device 1 was 6.5 ms. Thus, it can be confirmed that the response speed of the display device 1 is improved. In particular, the display device 1 can improve the response speed Toff, which cannot be supplemented by overdriving, and the response speed Toff of the display device 1 is increased four times or more as compared with the display device 100. In addition, a liquid crystal material and a driving method used in a liquid crystal display device in the past can be used as they are. The display device 1 can therefore be readily put to practical use.

Figure 10:
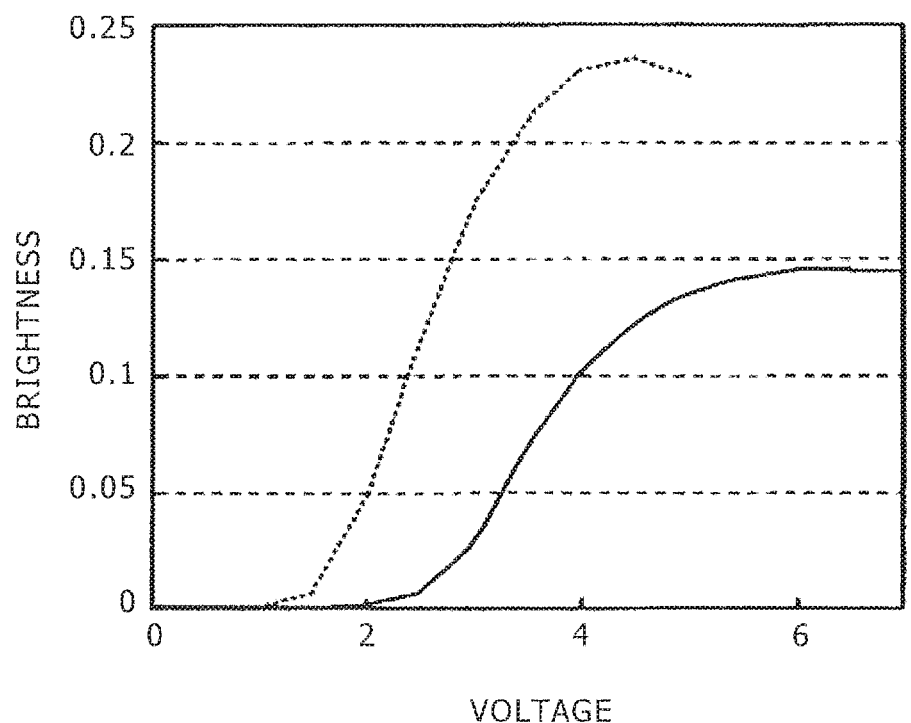
FIG. 10 is a diagram showing the voltage-luminance characteristic of the display device shown in FIG. 1.

It is considered that the response speed of such a display device 1 is increased due to a higher voltage applied in the display device 1. FIG. 10 is a diagram showing the voltage-luminance characteristic of the display device shown in FIG. 1. FIG. 10 shows relation between the applied voltage and brightness (luminance) of the display device 1 and the display device 100. A solid line represents the voltage-luminance characteristic of the display device 1. A broken line represents the voltage-luminance characteristic of the display device 100. FIG. 10 shows that the applied voltage of the display device 1 is higher than the applied voltage of the display device 100 when compared at the same brightness. This is because liquid crystal molecules rotated in opposite directions from each other are mixed with each other in a region around the middle of one side and the other side of the long sides of an opening 26A. This improves the response speed of the display device 1.

As described above, in the present embodiment, liquid crystal molecules in a region in proximity to one side of the long sides of an opening 26A of the common electrode 26 and liquid crystal molecules in a region in proximity to the other side of the long sides of the opening 26A are rotated in opposite directions from each other and aligned. Therefore the response speed can be improved. In addition, driving in the transverse electric field type can widen a viewing angle and improve an aperture ratio.

Further, because the common electrode 26 has the communicating extended-width parts 26B, the corner parts 26C can be provided to the openings 26A. A corner part 26C makes the direction of rotation of liquid crystal molecules from one end (the upper end or the lower end) of the opening 26A to the corner part 26C the same direction, and stabilizes the direction of alignment of the liquid crystal molecules.

Examples of modification of the present technology will be described in the following. Constituent elements common to those of the foregoing embodiment are identified by the same reference numerals, and description thereof will be omitted.

Modification Example 1

Figure 11A:
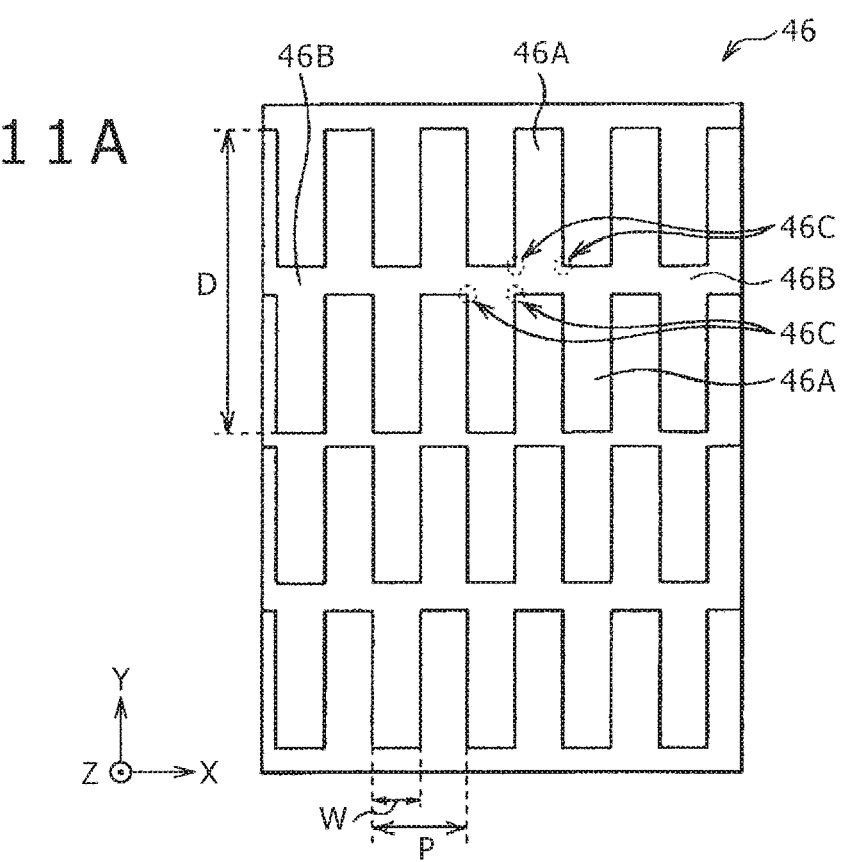
FIGS. 11A and 11B are plan views of a configuration of a common electrode according to a modification example 1.
Figure 11B:
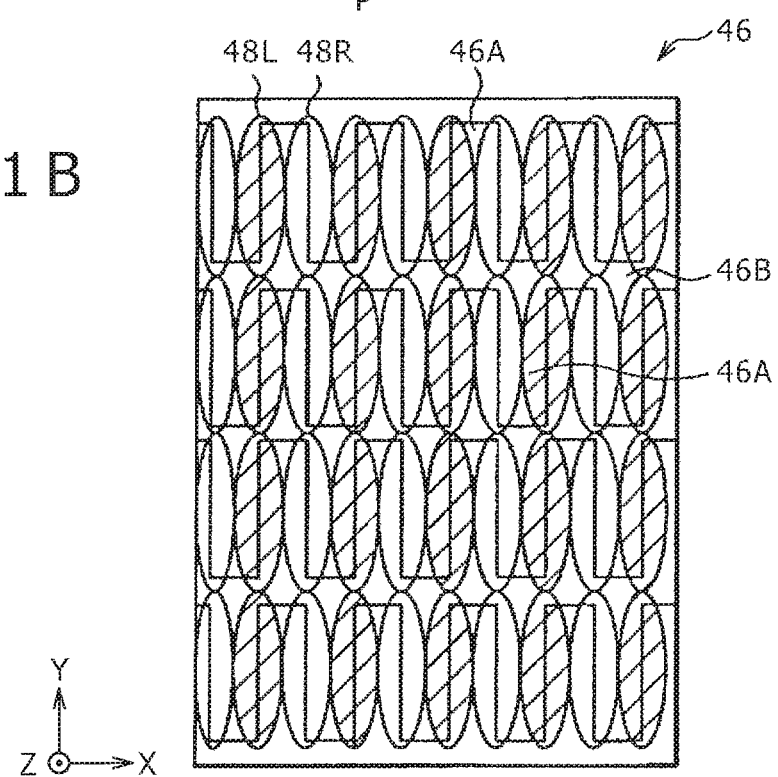

FIGS. 11A and 11B are plan views of a configuration of a common electrode according to a modification example 1. As shown in FIG. 11A, the common electrode 46 is different from the common electrode 26 in the foregoing embodiment in that the upper sides and lower sides of openings 46A are displaced from each other in a direction of width (X-axis direction) and arranged in a staggered form with communicating extended-width parts 46B interposed between the upper sides and the lower sides of the openings 46A. Incidentally, the long sides of the opening 46A have four corner parts 46C at points of intersection of the long sides of the opening 46A and the communicating extended-width parts 46B.

In the common electrode 46, one opening 46A is separated into an upper side and a lower side (in the Y-axis direction) with a communicating extended-width part 46B interposed between the upper side and the lower side, and the upper side and the lower side of the opening 46A are disposed so as to be displaced from each other by ½ P in the width direction. Openings 46A in a same row are therefore arranged in a staggered form. When one opening 46A is thus disposed so as to be displaced in the width direction, regions 48L in which liquid crystal molecules are rotated in the L-direction are aligned with each other and regions 48R in which liquid crystal molecules are rotated in the R-direction are aligned with each other in the extending direction of the openings 46A (Y-axis direction), as shown in FIG. 11B. Therefore the alignment of the liquid crystal molecules is more stabilized than in the foregoing embodiment.

Modification Example 2-1

Figure 12:
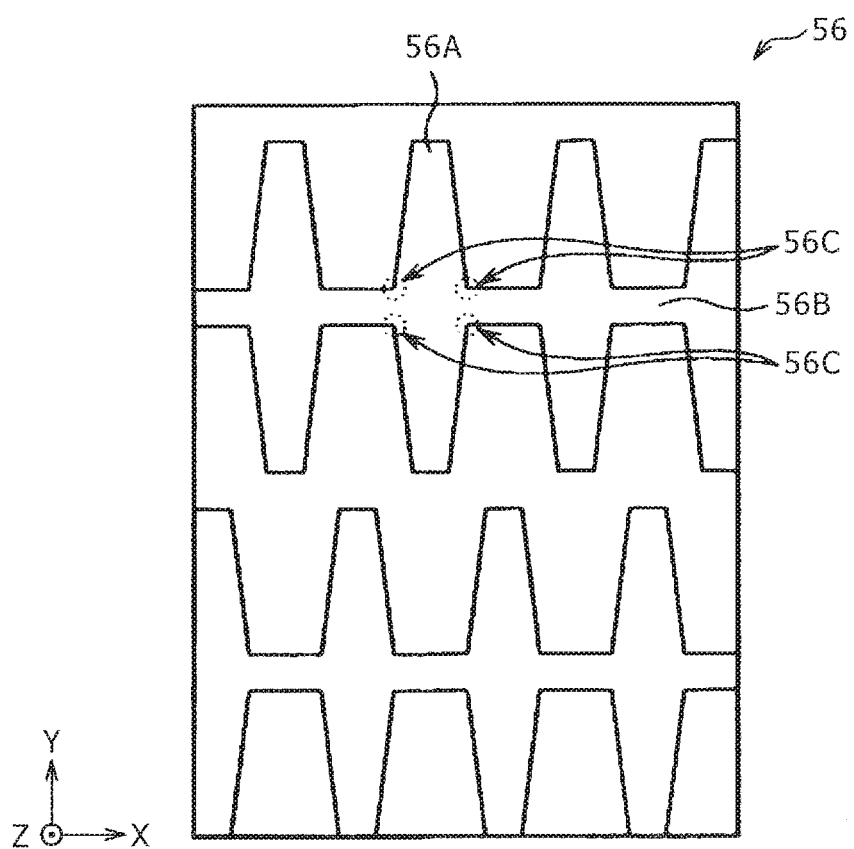
FIG. 12 is a plan view of a configuration of a common electrode according to a modification example 2-1.

FIG. 12 is a plan view of a configuration of a common electrode according to a modification example 2-1. The common electrode 56 is different from the common electrode 26 in the foregoing embodiment in that the common electrode 56 has openings 56A in substantially a rhombic shape. Incidentally, the long sides of an opening 56A have four corner parts 56C at points of intersection of the long sides of the opening 56A and a communicating extended-width part 56B.

The openings 56A are in substantially a rhombic shape formed by cutting off two corners on an upper side and a lower side. The sides in the extending direction (Y-axis direction) of the openings 56A are inclined at a predetermined angle to the Y-axis. Thereby, even when the directions of rubbing of alignment films somewhat deviate from the Y-axis direction due to a manufacturing error, the deviation is tolerated by the inclination, so that liquid crystal molecules can be aligned stably.

Modification Example 2-2

Figure 13:
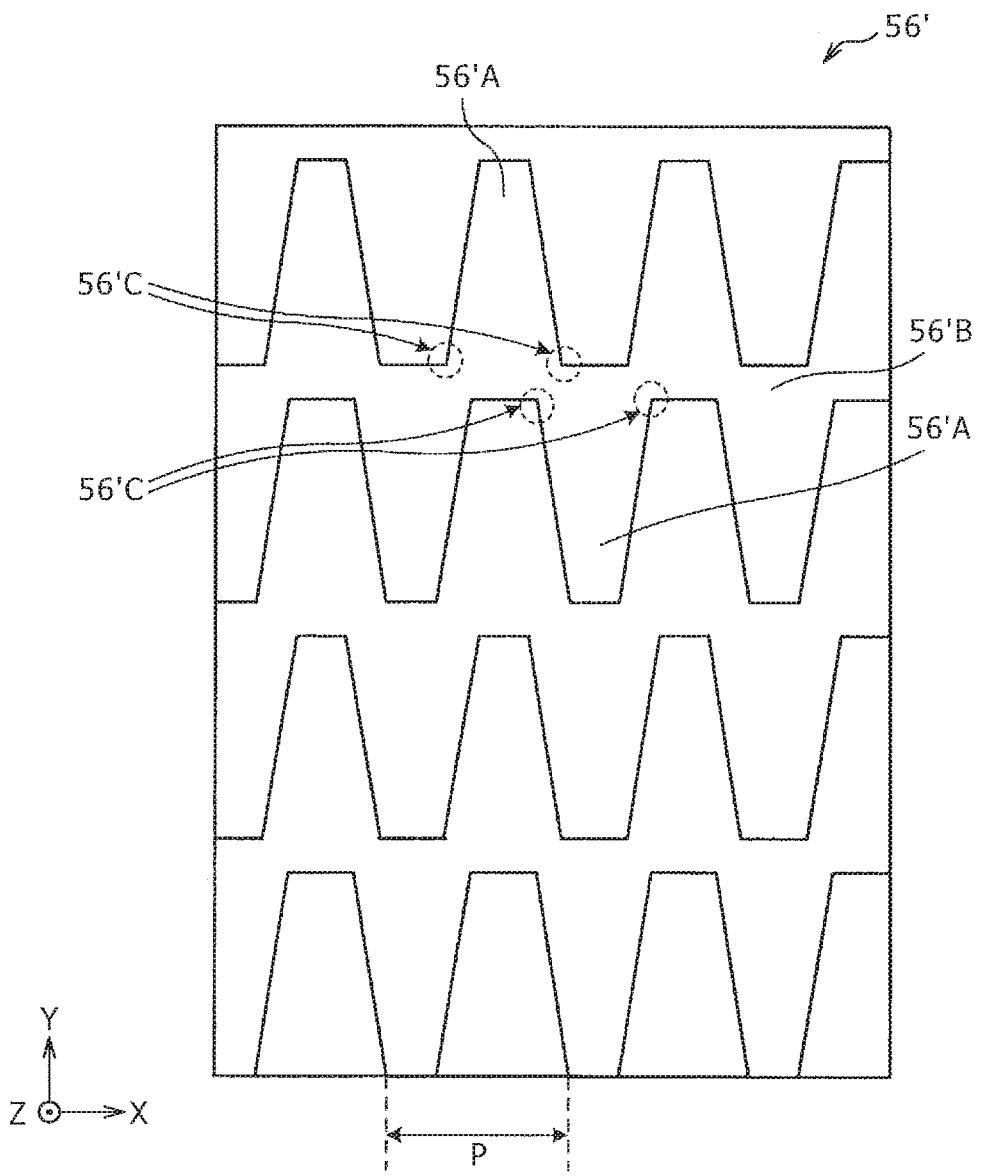
FIG. 13 is a plan view of a configuration of a common electrode according to a modification example 2-2.

FIG. 13 is a plan view of a configuration of a common electrode according to a modification example 2-2. As shown in FIG. 13, the common electrode 56' is different from the common electrode 26 in the foregoing embodiment in that the common electrode 56' has openings 56'A in substantially a rhombic shape and in that the upper sides and lower sides of the openings 56'A are displaced from each other in a direction of width (X-axis direction) and arranged in a staggered form with communicating extended-width parts 56'B interposed between the upper sides and lower sides of the openings 56'A. Incidentally, the long sides of an opening 56'A have four corner parts 56'C at points of intersection of the long sides of the opening 56'A and the communicating extended-width parts 56'B.

The openings 56'A are in substantially a rhombic shape formed by cutting off two corners on an upper side and a lower side. The sides in the extending direction (Y-axis direction) of the openings 56'A are inclined at a predetermined angle to the Y-axis. Thereby, even when the directions of rubbing of alignment films somewhat deviate from the Y-axis direction due to a manufacturing error, the deviation is tolerated by the inclination, so that liquid crystal molecules can be aligned stably.

In the common electrode 56', one opening 56'A is separated into an upper side and a lower side (in the Y-axis direction) with a communicating extended-width part 56'B interposed between the upper side and the lower side, and the upper side and the lower side of the opening 56'A are disposed so as to be displaced from each other by ½ P in the width direction. Openings 56'A in a same row are therefore arranged in a staggered form. When one opening 56'A is thus disposed so as to be displaced in the width direction, regions in which liquid crystal molecules are rotated in the L-direction are aligned with each other and regions in which liquid crystal molecules are rotated in the R-direction are aligned with each other in the extending direction of the openings 56'A (Y-axis direction). Therefore the alignment of the liquid crystal molecules is more stabilized than in the foregoing embodiment.

Second Embodiment

Description will next be made of a second embodiment.

In the display device 1 according to the first embodiment, the rubbing direction D27a of the alignment film 27a on the side of the substrate 21 is parallel to the extending direction of the openings 26A provided in the common electrode 26. Thus, a rising direction of the liquid crystal molecules of the liquid crystal layer 28 in the vicinity of the openings 26A may be unstable.

Figure 14A:
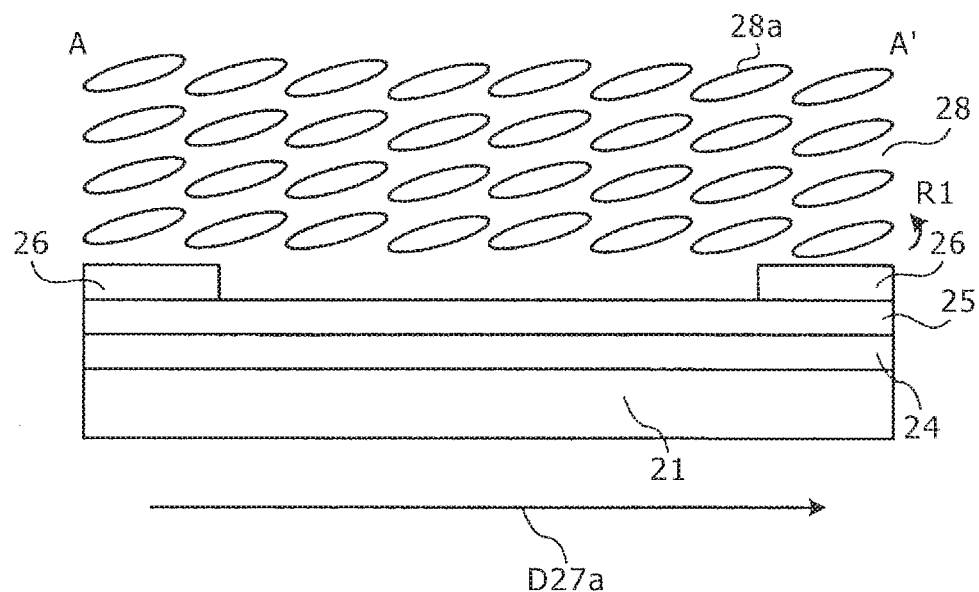
FIGS. 14A and 14B are sectional views taken along a dotted line A-A' of FIG. 2A.
Figure 14B:
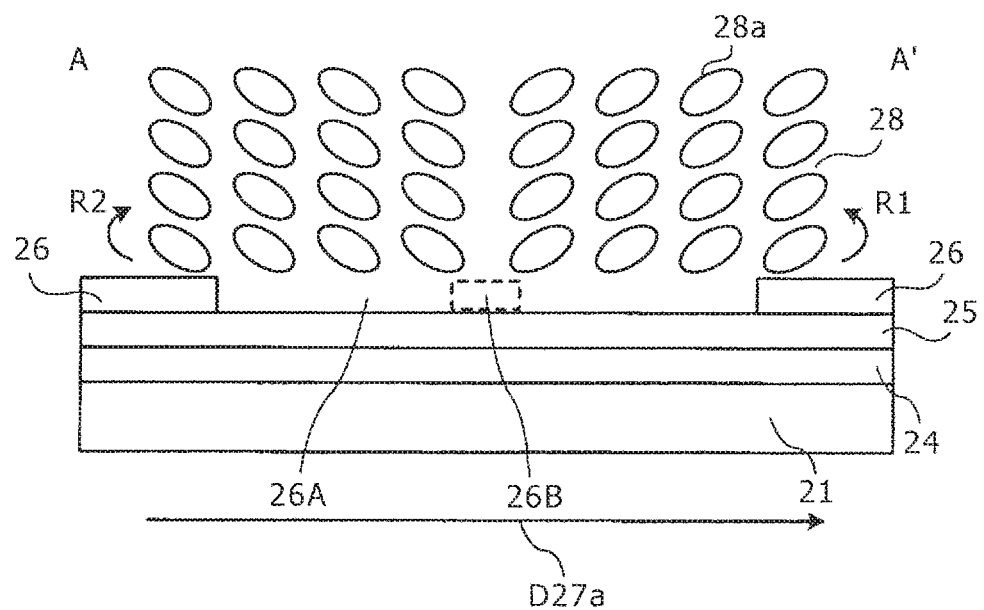

FIGS. 14A and 14B are sectional views taken along a dotted line A-A' of FIG. 2A. FIG. 14A shows a state in which no electric field is supplied to the liquid crystal layer 28. FIG. 14B shows a state in which an electric field is supplied to the liquid crystal layer 28.

As shown in FIG. 14A, when no electric field is supplied to the liquid crystal layer 28, all the liquid crystal molecules 28a are present in a state of being rotated in a rotation direction R1 by a predetermined angle to a horizontal direction such that ends of the liquid crystal molecules 28a in the rubbing direction D27a are situated above ends of the liquid crystal molecules 28a in the opposite direction. The rotation direction R1 of the liquid crystal molecules 28a at this time is referred to also as a pretilt direction.

When an electric field is supplied to the liquid crystal layer 28 in this state, as shown in FIG. 14B, the liquid crystal molecules 28a rise. In this case, the liquid crystal molecules 28a situated in a region extending in the rubbing direction D27a from a position where the opening 26A intersects the communicating extended-width part 26B rise so as to be rotated in the same direction as the pretilt direction (rotation direction R1). On the other hand, the liquid crystal molecules 28a situated in a region extending in an opposite direction from the rubbing direction D27a from the position where the opening 26A intersects the communicating extended-width part 26B rise so as to be rotated in an opposite direction (rotation direction R2) from the pretilt direction.

Incidentally, this phenomenon can occur also in the cases of the common electrode 26 shown in FIG. 3, the common electrode 46 shown in FIG. 11A, the common electrode 56 shown in FIG. 12, and the common electrode 56' shown in FIG. 13.

Thus, in the display device 1, the direction of alignment of the liquid crystal layer 28 in the vicinity of the openings 26A may not be stable.

On the other hand, a display device according to the second embodiment can stabilize the direction of alignment of the liquid crystal layer 28.

Figure 15:
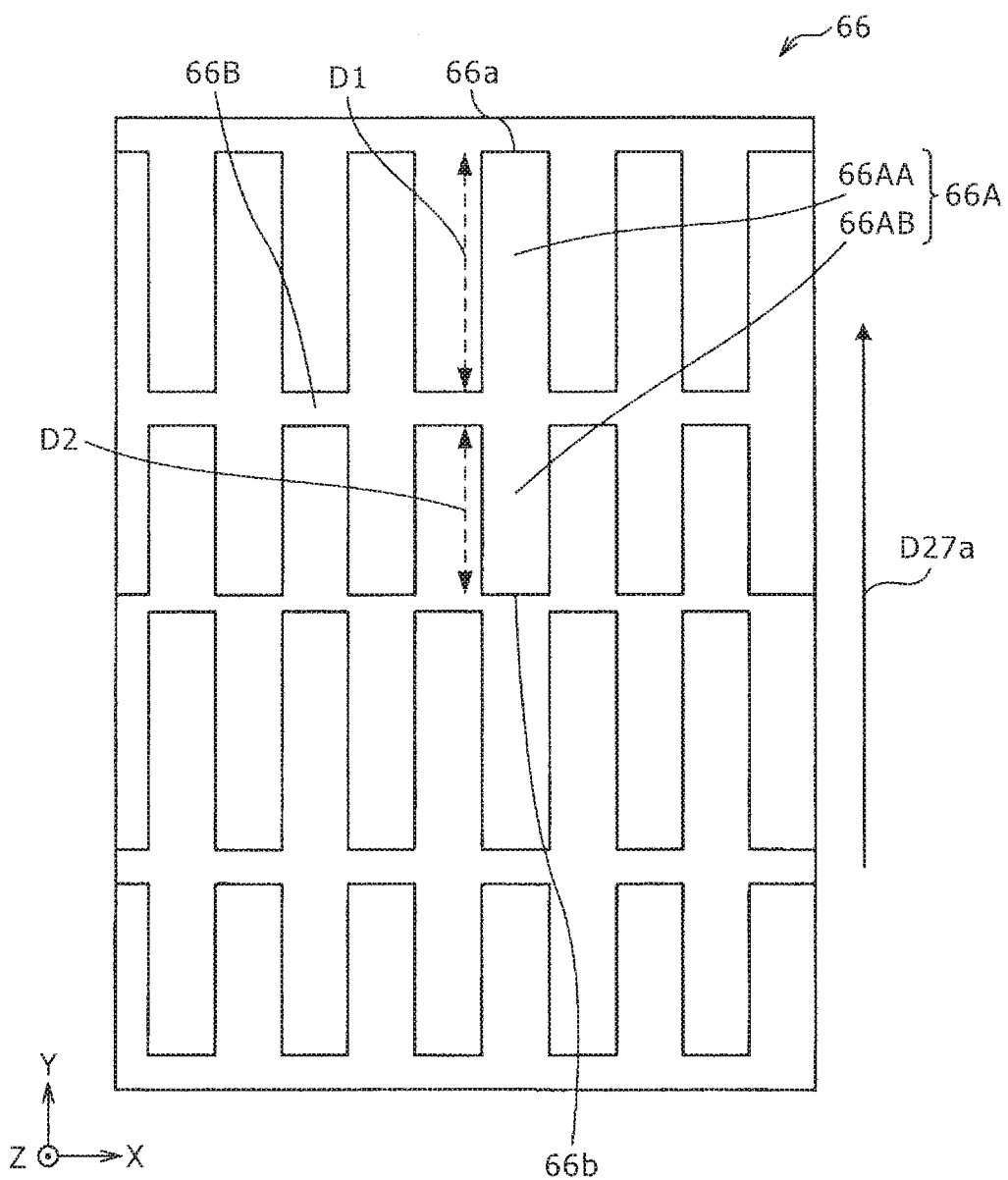
FIG. 15 is a diagram showing an example of a common electrode according to a second embodiment.

FIG. 15 is a diagram showing an example of a common electrode according to the second embodiment.

The display device according to the second embodiment has a common electrode 66 with openings in a different shape from those of the common electrode 26 in the display device 1 according to the first embodiment. Incidentally, the other configuration of the display device according to the second embodiment is similar to that of the display device 1.

As with the common electrode 26 shown in FIG. 2A, the common electrode 66 has a plurality of openings 66A extending in a Y-axis direction and communicating extended-width parts 66B extending in an X-axis direction and intersecting the openings 66A.

In this case, the openings 66A intersect the communicating extended-width parts 66B at a position closer to end parts 66b in an opposite direction from the rubbing direction D27a than end parts 66a in the rubbing direction D27a. That is, when the openings 66A are divided into openings 66AA including the end parts 66a and openings 66AB including the end parts 66b with the position of intersection with the communicating extended-width parts 66B as a boundary in the extending direction (Y-axis direction), the length D2 of the openings 66AB is shorter than the length D1 of the openings 66AA. Incidentally, the length D2 can be set to "0."

According to this configuration, the ratio of the liquid crystal molecules 28a rising so as to be rotated in the opposite direction from the pretilt direction when an electric field is supplied can be reduced in the liquid crystal layer 28, and thus the direction of alignment of the liquid crystal layer 28 can be stabilized.

Modification Example 3

An example of modification of the common electrode of the display device according to the second embodiment will next be described as a modification example 3.

Figure 16:
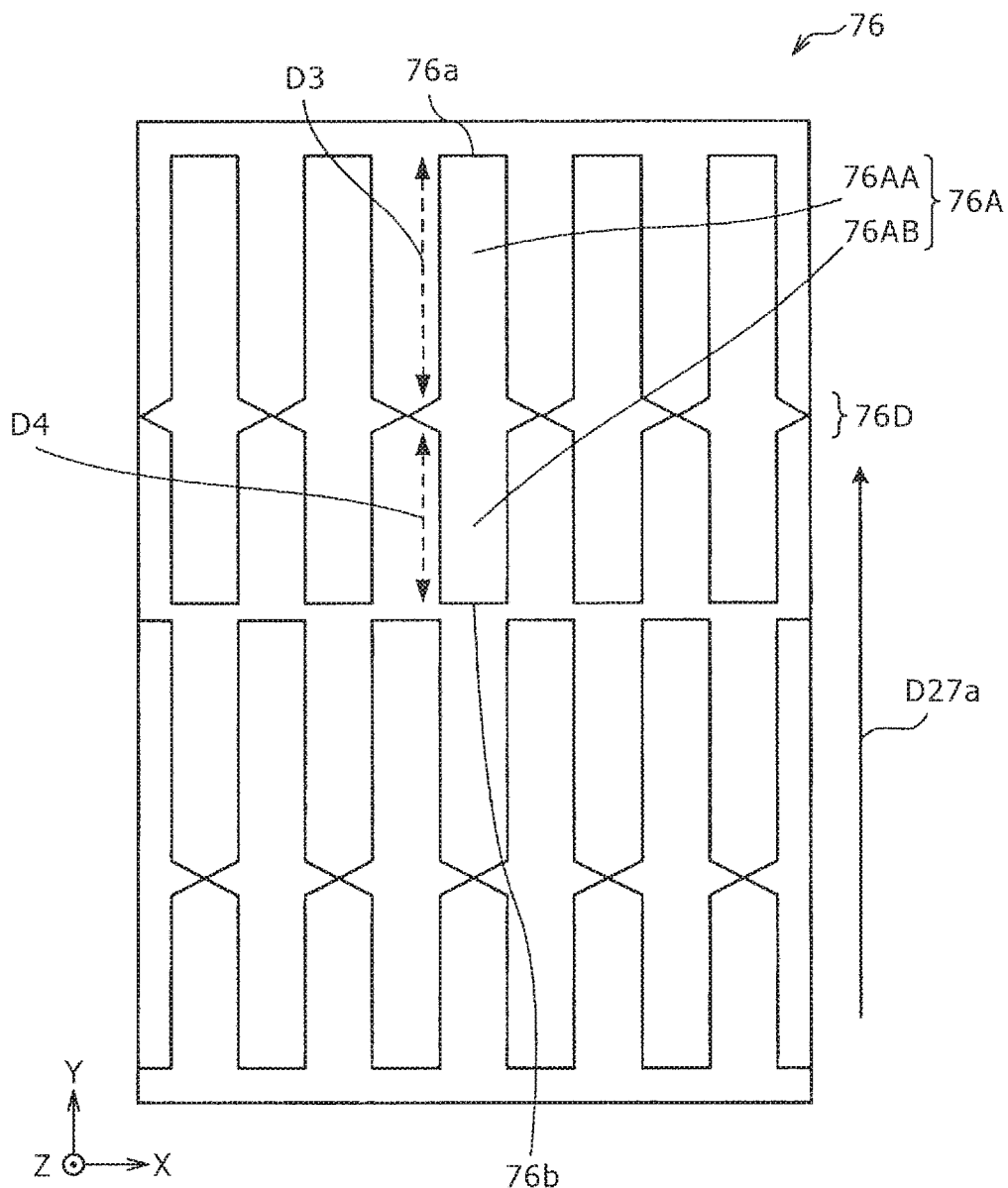
FIG. 16 is a diagram showing an example of a common electrode according to a modification example 3.

FIG. 16 is a diagram showing an example of a common electrode according to the modification example 3.

As with the common electrode 26 shown in FIG. 3, the common electrode 76 has a plurality of openings 76A extending in a Y-axis direction and provided with extended-width parts 76D.

In this case, the extended-width parts 76D are disposed at a position closer to end parts 76b in an opposite direction from a rubbing direction D27a than end parts 76a in the rubbing direction D27a in the openings 76A. That is, when the openings 76A are divided into openings 76AA including the end parts 76a and openings 76AB including the end parts 76b with the position of intersection with the extended-width parts 76D as a boundary in the extending direction (Y-axis direction), the length D4 of the openings 76AB is shorter than the length D3 of the openings 76AA. Incidentally, the length D4 can be set to "0."

According to this configuration, the ratio of the liquid crystal molecules 28a rising so as to be rotated in the opposite direction from the pretilt direction when an electric field is supplied can be reduced in the liquid crystal layer 28, and thus the direction of alignment of the liquid crystal layer 28 can be stabilized.

Modification Example 4

Another example of modification of the common electrode of the display device according to the second embodiment will next be described as a modification example 4.

Figure 17:
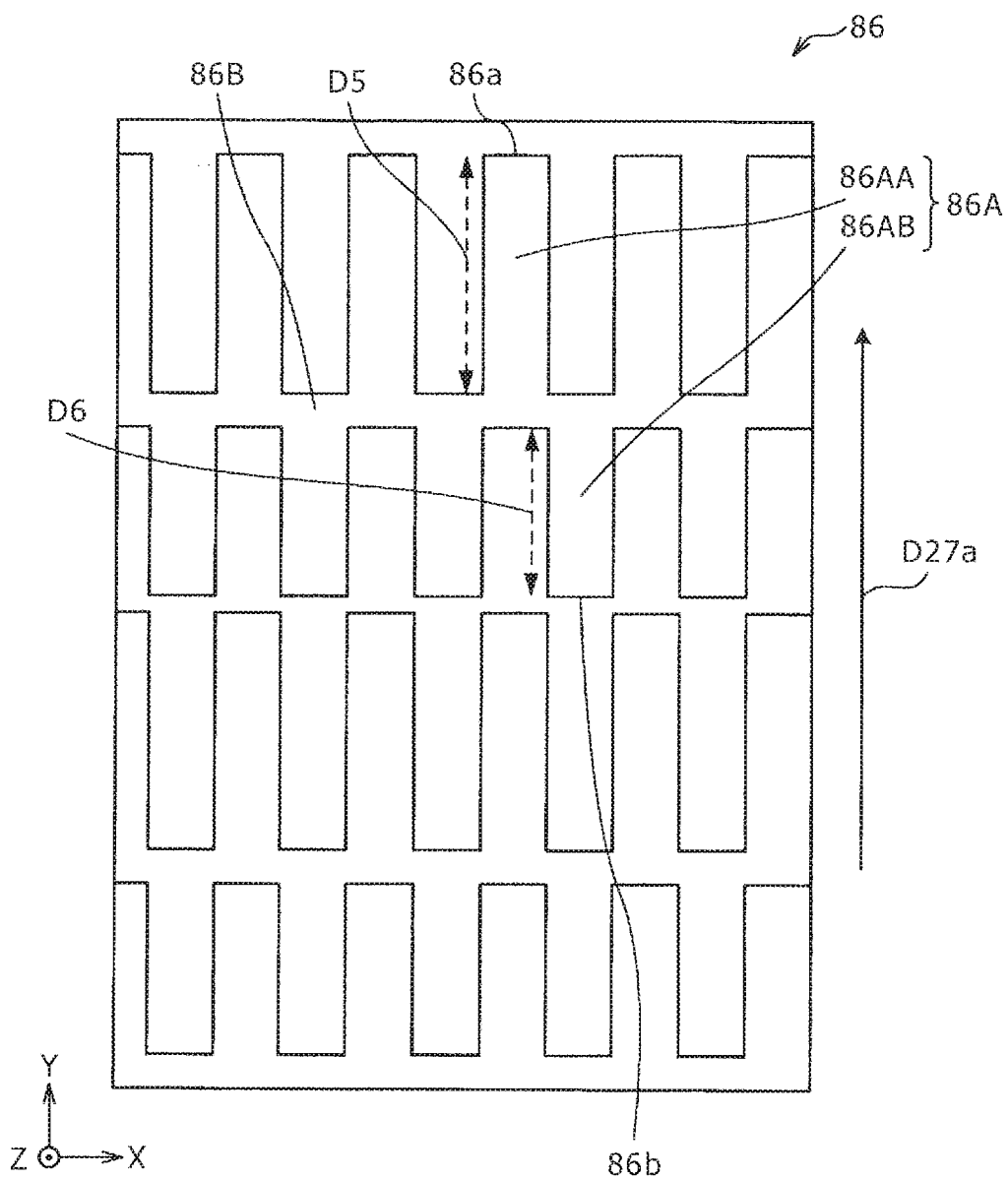
FIG. 17 is a diagram showing an example of a common electrode according to a modification example 4.

FIG. 17 is a diagram showing an example of a common electrode according to the modification example 4.

As with the common electrode 46 shown in FIG. 11A, the common electrode 86 has a plurality of openings 86A extending in a Y-axis direction and communicating extended-width parts 86B extending in an X-axis direction and intersecting the openings 86A. Further, one side and another side of the openings 86A, which sides are divided from each other in the extending direction (Y-axis direction)

with the communicating extended-width parts 86B as a boundary between the sides, are disposed so as to be displaced from each other in the width direction (X-axis direction).

In this case, the openings 86A intersect the communicating extended-width parts 86B at a position closer to end parts 86b in an opposite direction from a rubbing direction D27a than end parts 86a in the rubbing direction D27a. That is, when the openings 86A are divided into openings 86AA including the end parts 86a and openings 86AB including the end parts 86b with the position of intersection with the communicating extended-width parts 86B as a boundary in the extending direction (Y-axis direction), the length D6 of the openings 86AB is shorter than the length D5 of the openings 86AA. Incidentally, the length D6 can be set to "0."

According to this configuration, the ratio of the liquid crystal molecules 28a rising so as to be rotated in the opposite direction from the pretilt direction when an electric field is supplied can be reduced in the liquid crystal layer 28, and thus the direction of alignment of the liquid crystal layer 28 can be stabilized.

Modification Example 5-1

Yet another example of modification of the common electrode of the display device according to the second embodiment will next be described as a modification example 5-1.

Figure 18:
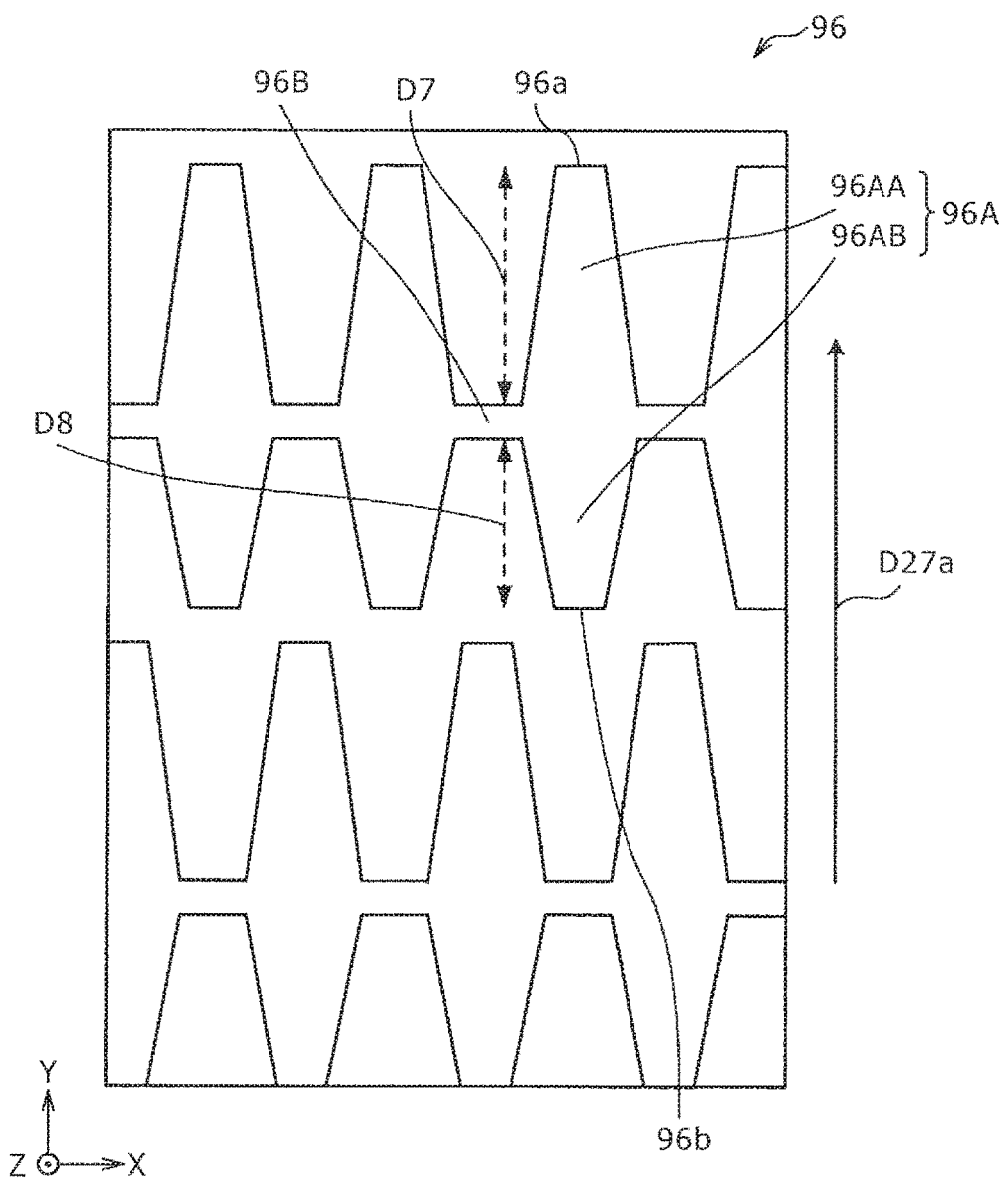
FIG. 18 is a diagram showing an example of a common electrode according to a modification example 5-1.

FIG. 18 is a diagram showing an example of a common electrode according to the modification example 5-1.

As with the common electrode 56 shown in FIG. 12, the common electrode 96 has a plurality of openings 96A in substantially a rhombic shape which openings 96A extend in a Y-axis direction and communicating extended-width parts 96B extending in an X-axis direction and intersecting the openings 96A.

In this case, the openings 96A intersect the communicating extended-width parts 96B at a position closer to end parts 96b in an opposite direction from a rubbing direction D27a than end parts 96a in the rubbing direction D27a. That is, when the openings 96A are divided into openings 96AA including the end parts 96a and openings 96AB including the end parts 96b with the position of intersection with the communicating extended-width parts 96B as a boundary in the extending direction (Y-axis direction), the length D8 of the openings 96AB is shorter than the length D7 of the openings 96AA. Incidentally, the length D8 can be set to "0."

According to this configuration, the ratio of the liquid crystal molecules 28a rising so as to be rotated in the opposite direction from the pretilt direction when an electric field is supplied can be reduced in the liquid crystal layer 28, and thus the direction of alignment of the liquid crystal layer 28 can be stabilized.

Modification Example 5-2

Yet another example of modification of the common electrode of the display device according to the second embodiment will next be described as a modification example 5-2.

Figure 19:
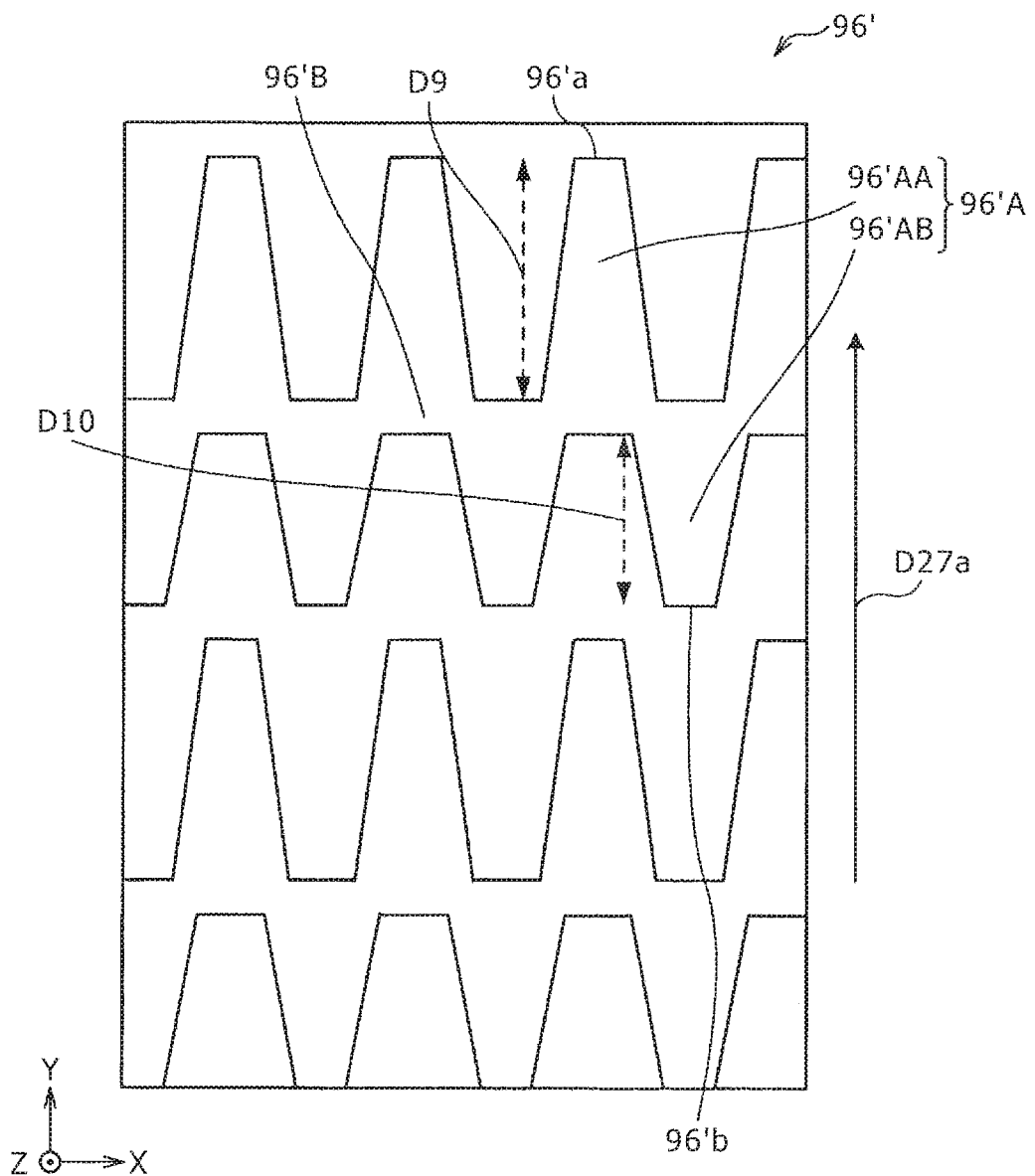
FIG. 19 is a diagram showing an example of a common electrode according to a modification example 5-2.

FIG. 19 is a diagram showing an example of a common electrode according to the modification example 5-2.

As with the common electrode 56' shown in FIG. 13, the common electrode 96' has a plurality of openings 96'A in substantially a rhombic shape which openings 96'A extend in a Y-axis direction and communicating extended-width parts 96'B extending in an X-axis direction and intersecting the openings 96'A. Further, one side and another side of the openings 96'A, which sides are divided from each other in the extending direction (Y-axis direction) with the communicating extended-width parts 96'B as a boundary between the sides, are disposed so as to be displaced from each other in the width direction (X-axis direction).

In this case, the openings 96'A intersect the communicating extended-width parts 96'B at a position closer to end parts 96'b in an opposite direction from a rubbing direction D27a than end parts 96'a in the rubbing direction D27a. That is, when the openings 96'A are divided into openings 96'AA including the end parts 96'a and openings 96'AB including the end parts 96'b with the position of intersection with the communicating extended-width parts 96'B as a boundary in the extending direction (Y-axis direction), the length D10 of the openings 96'AB is shorter than the length D9 of the openings 96'AA. Incidentally, the length D10 can be set to "0."

According to this configuration, the ratio of the liquid crystal molecules 28a rising so as to be rotated in the opposite direction from the pretilt direction when an electric field is supplied can be reduced in the liquid crystal layer 28, and thus the direction of alignment of the liquid crystal layer 28 can be stabilized.

Examples of Application

Description will next be made of examples of application of the display devices described in the foregoing embodiments and the foregoing modification examples. The display devices according to the foregoing embodiments and the like are applicable as display devices of electronic apparatuses in all fields which electronic apparatuses display an externally input video signal or a video signal generated within the electronic apparatuses as an image or video, such as television devices, digital cameras, notebook personal computers, portable terminal devices such as portable telephones and the like, video cameras, or the like.

(First Example of Application)

Figure 20:
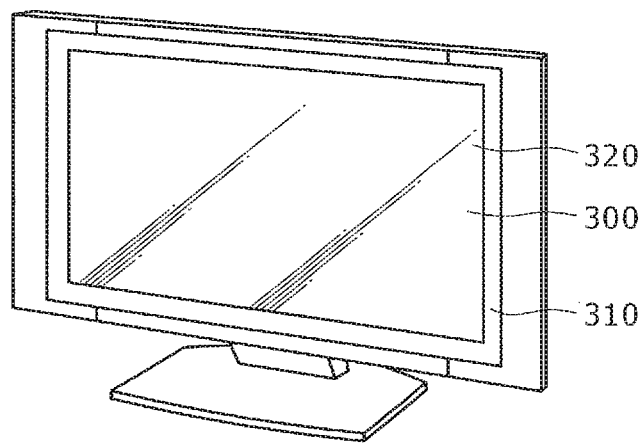
FIG. 20 is a perspective view of an external appearance of a television device to which the display devices according to the foregoing embodiments and the like are applied.

FIG. 20 is a perspective view of an external appearance of a television device to which the display devices according to the foregoing embodiments and the like are applied. This television device has for example a video display screen section 300 including a front panel 310 and a filter glass 320. The video display screen section 300 is formed by one of the display devices according to the foregoing embodiments and the like.

(Second Example of Application)

Figure 21A:
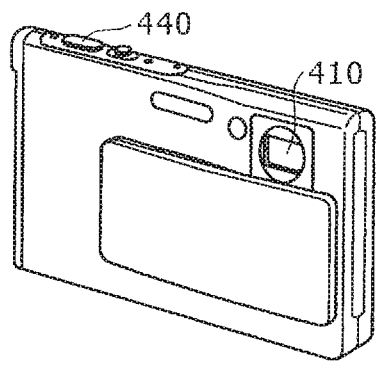
FIGS. 21A and 21B are perspective views of an external appearance of a digital camera to which the display devices according to the foregoing embodiments and the like are applied.
Figure 21B:
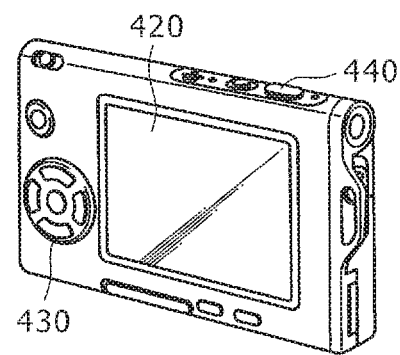

FIGS. 21A and 21B are perspective views of an external appearance of a digital camera to which the display devices according to the foregoing embodiments and the like are applied. FIG. 21A is a perspective view of the external appearance as viewed from a front side. FIG. 21B is a perspective view of the external appearance as viewed from a back side. This digital camera has for example a light emitting section 410 for flashlight, a display section 420, a menu switch 430, and a shutter button 440. The display section 420 is formed by one of the display devices according to the foregoing embodiments and the like.

(Third Example of Application)

Figure 22:
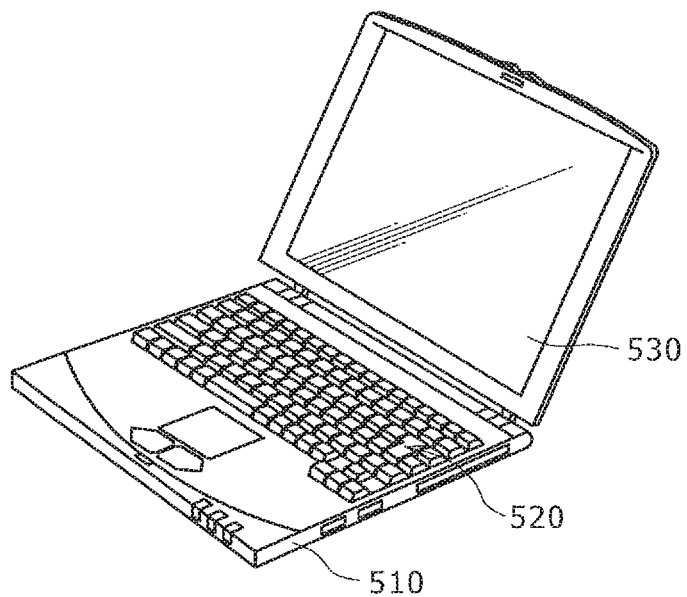
FIG. 22 is a perspective view of an external appearance of a notebook personal computer to which the display devices according to the foregoing embodiments and the like are applied.

FIG. 22 is a perspective view of an external appearance of a notebook personal computer to which the display devices according to the foregoing embodiments and the like are applied. This notebook personal computer has for example a main unit 510, a keyboard 520 for operations of inputting characters and the like, and a display section 530 for displaying an image. The display section 530 is formed by one of the display devices according to the foregoing embodiments and the like.

(Fourth Example of Application)

Figure 23:
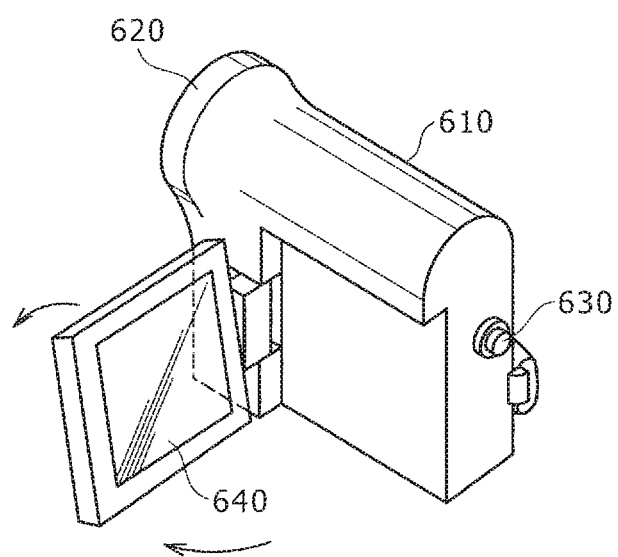
FIG. 23 is a perspective view of an external appearance of a video camera to which the display devices according to the foregoing embodiments and the like are applied.

FIG. 23 is a perspective view of an external appearance of a video camera to which the display devices according to the foregoing embodiments and the like are applied. This video camera has for example a main body section 610, a lens 620 for taking a subject, which lens is disposed in a front side surface of the main body section 610, a start/stop switch 630 at a time of picture taking, and a display section 640. The display section 640 is formed by one of the display devices according to the foregoing embodiments and the like.

(Fifth Example of Application)

FIGS. 24A to 24G are diagrams showing an external appearance of a portable telephone to which the display devices according to the foregoing embodiments and the like are applied. FIG. 24A is a front view of the portable telephone in an opened state. FIG. 24B is a side view of the portable telephone in the opened state. FIG. 24C is a front view of the portable telephone in a closed state. FIG. 24D is a left side view of the portable telephone in the closed state. FIG. 24E is a right side view of the portable telephone in the closed state. FIG. 24F is a top view of the portable telephone in the closed state. FIG. 24G is a bottom view of the portable telephone in the closed state. This portable telephone is for example formed by coupling an upper side casing 710 and a lower side casing 720 to each other by a coupling part (hinge part) 730. The portable telephone has a display 740, a sub-display 750, a picture light 760, and a camera 770. The display 740 or the sub-display 750 is formed by one of the display devices according to the foregoing embodiments and the like.

The present technology has been described above by citing embodiments and examples of modification. However, the present technology is not limited to the foregoing embodiments and the like, but is susceptible of various modifications. For example, in the foregoing embodiments and the like, description has been made of a case where an electric field control section is provided by the extended-width parts (communicating extended-width parts). However, the electric field control section may be formed by distributing films of different dielectric constants on the common electrode.

In addition, a case where openings are provided on the side of the common electrode has been illustrated in the foregoing embodiments and the like. However, openings may be provided on the side of the pixel electrode in place of the openings on the side of the common electrode.

Further, for example, the materials and thicknesses or the forming methods and forming conditions or the like of the respective parts described in the foregoing embodiments and the like are not limited, but may be other materials and thicknesses or other forming methods and forming conditions.

It is to be noted that the present technology can also adopt the following constitutions.

(1) A display device including:

an electrode layer including a first electrode and a second electrode, the second electrode being opposed to the first electrode and having a plurality of openings extending in a same extending direction; and a liquid crystal layer disposed on the electrode layer, liquid crystal molecules of the liquid crystal layer in a region in proximity to one side of the opening and liquid crystal molecules of the liquid crystal layer in a region in proximity to another side of the opening, the sides of the opening being opposed to each other in a width direction of the opening, being rotated in opposite directions from each other and aligned.

(2) The display device according to the above (1), wherein the openings have an electric field control section, and liquid crystal molecules from an end of the opening to the electric field control section in the extending direction are rotated in a same rotation direction.

(3) The display device according to the above (2), wherein the openings have an extended-width part in the width direction of the openings, and the electric field control section is a corner part disposed at a point of intersection of the opening and the extended-width part.

(4) The display device according to the above (3), wherein the extended-width part is a communicating extended-width part for making the openings adjacent to each other in the width direction communicate with each other.

(5) The display device according to the above (4), wherein an upper side part and a lower side part of the opening are displaced from each other in the width direction and arranged in a staggered form with the communicating extended-width part interposed between the upper side part and the lower side part of the opening.

(6) The display device according to one of the above (1) to (5), wherein an alignment film is disposed between the electrode layer and the liquid crystal layer, and the alignment film has been subjected to a rubbing process in a direction parallel to the extending direction.

(7) The display device according to the above (1), wherein an alignment film is disposed between the electrode layer and the liquid crystal layer, the alignment film having been subjected to a rubbing process in a predetermined direction parallel to the extending direction, and the openings have an extended-width part at a position closer to an end part in a direction opposite from the predetermined direction than an end part in the predetermined direction.

(8) The display device according to the above (7), wherein the extended-width part is a communicating extended-width part for making the openings adjacent to each other in the width direction communicate with each other.

(9) The display device according to the above (8), wherein the openings are divided into a first opening and a second opening in the extending direction with the communicating extended-width part as a boundary, and the first opening and the second opening are disposed so as to be displaced from each other in the width direction.

(10) The display device according to one of the above (1) to (9), wherein the openings adjacent to each other in the extending direction are displaced from each other in the width direction and arranged in a staggered form.

(11) The display device according to one of the above (1) to (10), wherein the openings have a rectangular shape.

(12) The display device according to one of the above (1) to (10), wherein the openings have a substantially rhombic shape.

(13) The display device according to one of the above (1) to (12), wherein a dielectric film is disposed between the first electrode and the second electrode.

(14) An electronic apparatus including:

a display device;

wherein the display device includes
an electrode layer including a first electrode and a second electrode, the second electrode being opposed to the first electrode and having a plurality of openings extending in a same extending direction, and
a liquid crystal layer disposed on the electrode layer, liquid crystal molecules of the liquid crystal layer in a region in proximity to one side of the opening and liquid crystal molecules of the liquid crystal layer in a region in proximity to another side of the opening, the sides of the opening being opposed to each other in a width direction of the opening, being rotated in opposite directions from each other and aligned.

(15) A method of manufacturing a display device, the method including:
forming an electrode layer including a first electrode and a second electrode, the second electrode being opposed to the first electrode and having a plurality of openings extending in a same extending direction; and
forming a liquid crystal layer on the electrode layer after performing alignment treatment so that liquid crystal molecules of the liquid crystal layer in a region in proximity to one side of an opening and liquid crystal molecules of the liquid crystal layer in a region in proximity to another side of the opening, the sides of the opening being opposed to each other in a width direction of the opening, are rotated in opposite directions from each other and aligned.

What is claimed is:

1. A display device comprising:
an electrode including a plurality of openings, wherein
in a plan view perspective, each of the openings has a width extending in a width direction and a length extending in an extending direction, the length being greater than the width,
respective ones of the openings each have a first side and a second side that are opposed to each other in the width direction,
adjacent ones of the openings in the width direction have a communicating part in the width direction, and
each communicating part communicates the openings adjacent to each other in the width direction; and
a liquid crystal layer including liquid crystal molecules and disposed on the electrode,
wherein the openings adjacent to each other in the extending direction are displaced from each other in the width direction and arranged in a staggered form,
wherein, for a corresponding one of the openings, in the plan view perspective, respective ones of the liquid crystal molecules in a first region in proximity to the first side of the opening are aligned and rotated in a first direction, and respective ones of the liquid crystal molecules in a second region in proximity to the second side of the opening are aligned and rotated in a second direction that is opposite to the first direction,
wherein each of the openings has a first end and a second end in the extending direction, and
wherein the communicating part is arranged at a position closer to the first end than to the second end in the extending direction.

2. The display device according to claim 1, wherein
respective ones of the openings include a corner part disposed at a point of intersection of the opening and the communicating part, and
the liquid crystal molecules from an end of the opening to the corner part in the extending direction are rotated in a same rotation direction.

3. The display device according to claim 1, wherein an upper side part and a lower side part of the opening are displaced from each other in the width direction and arranged in a staggered form with the communicating part interposed between the upper side part and the lower side part of the opening.

4. The display device according to claim 1, wherein the openings are divided into a first opening and a second opening in the extending direction with the communicating part as a boundary, and the first opening and the second opening are disposed so as to be displaced from each other in the width direction.

5. The display device according to claim 1, wherein the openings have a rectangular shape.

6. The display device according to claim 1, wherein the openings have a substantially rhombic shape.

7. A display device comprising:
an electrode including a plurality of openings, wherein
in a plan view perspective, each of the openings has a width extending in a width direction and a length extending in an extending direction, the length being greater than the width,
respective ones of the openings each have a first side and a second side that are opposed to each other in the width direction,
adjacent ones of the openings in the width direction have a communicating part in the width direction, and
each communicating part communicates the openings adjacent to each other in the width direction; and
a liquid crystal layer including liquid crystal molecules and disposed on the electrode,
wherein the openings adjacent to each other in the extending direction are displaced from each other in the width direction and arranged in a staggered form,
wherein, for a corresponding one of the openings, in the plan view perspective, respective ones of the liquid crystal molecules in a first region in proximity to the first side of the opening are aligned and rotated in a first direction, and respective ones of the liquid crystal molecules in a second region in proximity to the second side of the opening are aligned and rotated in a second direction that is opposite to the first direction,
wherein each of the openings has a first length that is the length extending in the extending direction,
wherein the communicating part has a second length in the extending direction, and
wherein the openings adjacent to each other in the extending direction are displaced from each other in the width direction and arranged in the staggered form such that the opening having the first length and the communicating part having the second length shorter than the first length are alternately arranged in the extending direction.

8. The display device according to claim 7, wherein
respective ones of the openings include a corner part disposed at a point of intersection of the opening and the communicating part, and
the liquid crystal molecules from an end of the opening to the corner part in the extending direction are rotated in a same rotation direction.

9. The display device according to claim 7, wherein an upper side part and a lower side part of the opening are displaced from each other in the width direction and arranged in a staggered form with the communicating part interposed between the upper side part and the lower side part of the opening.

10. The display device according to claim 7, wherein the openings are divided into a first opening and a second opening in the extending direction with the communicating part as a boundary, and the first opening and the second opening are disposed so as to be displaced from each other in the width direction.

11. The display device according to claim 7, wherein the openings have a rectangular shape.

12. The display device according to claim 7, wherein the openings have a substantially rhombic shape.

* * * * *